United States Patent
Matsuura et al.

(10) Patent No.: US 7,284,803 B2
(45) Date of Patent: Oct. 23, 2007

(54) VEHICLE BRAKE CONTROL APPARATUS

(75) Inventors: Masahiro Matsuura, Chiryu (JP);
Shigeru Saito, Kariya (JP); Koichi Kokubo, Kariya (JP); Yuji Sengoku, Aichi-gun (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 11/285,187

(22) Filed: Nov. 23, 2005

(65) Prior Publication Data

US 2006/0131956 A1 Jun. 22, 2006

(30) Foreign Application Priority Data

Dec. 22, 2004 (JP) ............................ 2004-372134
Sep. 26, 2005 (JP) ............................ 2005-277948

(51) Int. Cl.
*B60T 8/64* (2006.01)

(52) U.S. Cl. .................................... 303/152

(58) Field of Classification Search ................ 303/152, 303/155, 9.71; 701/70
See application file for complete search history.

(56) References Cited

U.S. PATENT DOCUMENTS 5,707,115 A * 1/1998 Bodie et al. ................... 303/3
6,508,523 B2 * 1/2003 Yoshino ...................... 303/152
7,059,691 B2 * 6/2006 Tsunehara et al. .......... 303/152
7,076,357 B2 * 7/2006 Hamada et al. ............... 701/70
7,077,484 B2 * 7/2006 Sasaki et al. ................ 303/152
2004/0256912 A1 * 12/2004 Hamada et al. .......... 303/113.5
2005/0218717 A1 * 10/2005 Nishina et al. ............. 303/152

FOREIGN PATENT DOCUMENTS

JP 2003-160039 6/2003
JP 2004-009914 1/2004

* cited by examiner

*Primary Examiner*—Christopher P. Schwartz
(74) *Attorney, Agent, or Firm*—Buchanan Ingersoll & Rooney PC

(57) ABSTRACT

In a vehicle brake apparatus, front-wheel brake power is controlled with fluid pressure brake power (a front-wheel VB fluid pressure part Fvbf+an increase in fluid pressure brake power equivalent to a liner valve pressure difference $\Delta P1$) and regenerative brake power Freg, while rear-wheel brake power is controlled with only fluid pressure brake power (a rear-wheel VB fluid pressure part Fvbr+an increase in fluid pressure brake power equivalent to a liner valve pressure difference $\Delta P2$), so that regenerative and cooperative brake controlling is executed. When a brake pedal is additionally depressed during front/rear brake power proportion controlling, the shortage of the total brake power is compensated by adding additional brake power Fadd, which is the same as rear-wheel brake power shortage $\Delta Fr$ generated by the additional depression, to the front-wheel brake power.

16 Claims, 14 Drawing Sheets

VEHICLE BRAKE CONTROL APPARATUS

BACKGROUND OF THE INVENTION

1. Field of the Invention

The present invention relates to a brake control apparatus for vehicles.

2. Description of the Related Art

An automatic braking apparatus for automatically controlling the fluid pressure of wheel cylinders independently of the operation of brake operation members, such as a brake pedal, by a driver has been widely known. For example, the automatic braking apparatus disclosed in Japanese Unexamined Patent Application Publication No. 2004-9914 includes a master cylinder for generating a master fluid pressure (master cylinder fluid pressure and vacuum booster fluid pressure) independently of the operation of a brake pedal on the basis of the operation of a vacuum booster corresponding to the operation of the brake pedal, a fluid pressure pump for generating a pressurizing fluid pressure higher than the master fluid pressure, and a normally open linear electromagnetic valve for adjusting the applied pressure (pressure difference) to the master fluid pressure using the pressurizing fluid pressure by the fluid pressure pump.

In this apparatus, a distance between oneself vehicle having the apparatus mounted thereon and a vehicle ahead is detected, and when the distance is less than a predetermined reference value, the fluid pressure pump and the normally-open linear electromagnetic valve are controlled. The apparatus is to automatically apply a braking force to the oneself vehicle independently of the brake pedal operation by a driver by automatically controlling the braking force based on the fluid pressure (fluid pressure braking force) using "the master fluid pressure having the applied pressure added thereto" generated by the apparatus.

Recently, techniques have been developed in which the above-mentioned automatic brake apparatus is applied to a motorized vehicle using a motor as a drive source and a so-called hybrid vehicle using a motor and an internal combustion engine together as drive sources so that the regenerative and cooperative brake controls using the fluid pressure braking force and the regenerative braking force together are executed.

More specifically, the apparatus establishes boosting characteristics of the vacuum booster so that the master fluid pressure relative to the operation force of the brake pedal (depressing force of the brake pedal) intentionally has a value lower than a predetermined target value. Thereby, "the fluid pressure braking force based on the master fluid pressure (master fluid pressure braking force)" relative to the depressing force of the brake pedal is established so as to intentionally have a value lower than a predetermined target value.

The apparatus is to adjust a compensatory braking force (specifically, the regenerative braking force and the applied fluid pressure braking force) in accordance with the brake-pedal depressing force so that characteristics of the sum of the master fluid pressure braking force and the compensatory braking force including "the regenerative braking force due to the motor" and/or "the fluid pressure braking force based on the applied pressure due to the normally-open linear electromagnetic valve (the increase in fluid pressure braking force to the applied pressure or the applied fluid pressure braking force)" (the sum of the braking forces applied to front wheels and the braking force applied to rear wheels) relative to the brake-pedal depressing force agree with predetermined target characteristics. In addition, the regenerative braking force due to the motor is used with priority over the applied fluid pressure braking force.

Thereby, the characteristics of the total braking force relative to the brake-pedal depressing force agree with the target characteristics, so that the uncomfortable brake feeling of a driver is not generated. Additionally, when the vehicle speed is reduced due to the brake-pedal operation by the driver, the electric energy generated by the motor corresponding to the regenerative braking force due to the motor can be actively recovered to a battery, resulting in good gas mileage of the vehicle by improving the energy efficiency of the entire apparatus.

On the other hand, during the brake-pedal operation by the driver, if the rear wheels are locked ahead of the front wheels, the vehicle running is liable to be unstable. Hence, if the rear wheels are liable to be locked ahead of the front wheels, there is a control for holding the fluid pressure of the rear wheel cylinders (referred to as the front/rear brake power proportioning control below). By performing the front/rear brake power proportioning control, the increase in brake power applied to the rear wheels is prohibited, preventing the rear wheels from being locked ahead of the front wheels.

Techniques have been developed in which to a motorized vehicle having a motor for driving front wheels as a drive source or a hybrid vehicle having a motor, the above-mentioned automatic brake apparatus is applied and the front/rear brake power proportioning control is executed in addition to the regenerative and cooperative brake controls mentioned above.

That is, in this technique, during the brake-pedal operation, the regenerative and cooperative brake controls are executed. Thereby, the brake power applied to the front wheels is controlled by the fluid pressure brake power and the regenerative brake power while the brake power applied to the rear wheels is controlled only by the fluid pressure braking force. In this technique, if the rear wheels are liable to be locked ahead of the front wheels during performing the regenerative and cooperative brake controls, the wheel cylinder fluid pressure of the rear wheels (i.e., the fluid pressure brake power of the rear wheels) is held by executing the front/rear brake power proportioning control. During executing the front/rear brake power proportioning control, the fluid pressure brake power of the rear wheels is thereby maintained at the value in the start time of the front/rear brake power proportioning control.

In this apparatus, during execution of the front/rear brake power proportioning control, even when the brake-pedal operation demands a braking force larger than that of the brake-pedal operation at the start time of the front/rear brake power proportioning control (referred to as "additional depression" below), the fluid pressure brake power applied to the rear wheels is maintained at the value in the start time of the front/rear brake power proportioning control.

Thereby, after the additional depression, the fluid pressure brake power applied to the rear wheels is insufficient in comparison with the case where the front/rear brake power proportioning control is not executed (the case where the front/rear brake power proportioning control is executed and the brake-pedal operation demands the same brake power as that after the additional depression). In other words, the total brake power (the sum of the braking forces applied to front wheels and the braking force applied to rear wheels) after the additional depression is insufficient in comparison with the case where the front/rear brake power proportioning control is not executed.

Accordingly, in this case, characteristics of the total braking force relative to the brake-pedal depressing force is insufficient for predetermined target characteristics, so that the optimum braking force relative to the brake-pedal depressing force cannot be maintained. It is therefore preferable that when the additional depression is performed during execution of the front/rear brake power proportioning control, the shortage of the fluid pressure brake power applied to the rear wheels (i.e., the total braking force) be compensated.

SUMMARY OF THE INVENTION

The present invention has been made in order to solve such problems, and in vehicle brake control apparatuses executing regenerative and cooperative brake controls using a fluid pressure braking force and a regenerative braking force together at least in front wheels while performing a front/rear brake power proportioning control for preventing rear wheels from being locked ahead of the front wheels, it is an object of the present invention to provide a vehicle brake control apparatus capable of compensating the shortage of a total braking force that may be generated if additional depression is executed during the front/rear brake power proportioning controlling.

A vehicle brake apparatus incorporating a vehicle brake control apparatus according to the present invention is applied to vehicles (a motorized vehicle or a hybrid vehicle) having a motor for driving at least front wheels (i.e., a motor for driving the front wheels or respective motors for driving front and rear wheels). In other words, this vehicle brake apparatus is applied to a vehicle with a braking force applied to front wheels controlled by a fluid pressure braking force and a regenerative braking force and with a braking force applied to rear wheels controlled only by the fluid pressure braking force, or a vehicle with braking forces applied to rear and front wheels controlled by both the fluid pressure braking force and the regenerative braking force.

The vehicle brake apparatus includes master fluid pressure generating means for generating a master fluid pressure corresponding to the operation of a brake operating member by a driver; pressuring means for generating a pressuring fluid pressure for generating a fluid pressure higher than the master fluid pressure; pressure adjusting means for adjusting the magnitude of pressuring the master fluid pressure using the pressuring fluid pressure by the pressuring means; and regenerative brake power controlling means for controlling the regenerative brake power generated by the motor.

The master fluid pressure generating means includes a master cylinder for generating the master fluid pressure (master cylinder fluid pressure, vacuum booster fluid pressure) on the basis of the operation of includes a hydro-booster being movable corresponding to the operation of the hydro-booster corresponding to the operation of the brake operating member by the driver. The pressuring means includes a fluid pressure pump (gear pump) for delivering brake fluid to a fluid pressure circuit generating wheel cylinder fluid pressure.

The pressure adjusting means includes a linear wheel cylinder fluid pressure (normally open or closed) arranged between the fluid pressure circuit generating the master fluid pressure and the fluid pressure circuit generating the wheel cylinder fluid pressure. By controlling the liner wheel cylinder fluid pressure using the pressuring fluid pressure by the operation of the fluid pressure pump, the pressuring magnitude (pressure difference) to the master fluid pressure (i.e., the value obtained by the master fluid pressure from the wheel cylinder fluid pressure) can be continuously adjusted, so that the wheel cylinder fluid pressure can be continuously adjusted regardless of the master fluid pressure (i.e., the operation of the brake operating member).

The regenerative brake power controlling means an inverter for controlling AC electric power supplied to an AC synchronous motor as a vehicle drive source (i.e., controlling the motor drive power) as well as for controlling AC electric power generated by the motor as a generator (i.e., controlling the generating resistance that is, the regenerative brake power).

The vehicle brake control apparatus according to the present invention executes the regenerative and cooperative brake controlling. That is, the apparatus includes regenerative and cooperative brake controlling means for adjusting compensation brake power corresponding to the operation of the brake operating member so that characteristics of total brake power (the sum of the brake power applied to the front wheels and the brake power applied to the rear wheels) relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means (the increase in fluid pressure brake power to the pressuring magnitude, i.e., the pressuring fluid pressure brake power).

The vehicle brake control apparatus according to the present invention also executes the front/rear brake power proportion controlling. That is, the apparatus includes the front/rear brake power proportion controlling means for controlling front/rear brake power proportioning which prohibits an increase in brake power applied to rear wheels when the rear wheels are liable to be locked ahead of the front wheels during the operation of the brake operating member by the driver.

The front/rear brake power proportion controlling means herein determines that the rear wheels are liable to be locked ahead of the front wheels when the value obtained by subtracting the rear wheel speed (average wheel speed) from the front wheel speed (average wheel speed) becomes more than a predetermined value so as to start the front/rear brake power proportion controlling. Then, the front/rear brake power proportion controlling means maintains the brake power applied to the rear wheels as the front/rear brake power proportion controlling.

Specifically, for the vehicle with the rear-wheel brake power controlled only by the fluid pressure brake power, the rear-wheel wheel cylinder fluid pressure (i.e., the rear-wheel fluid pressure brake power) is maintained. For the vehicle with the rear-wheel brake power controlled by the fluid pressure brake power and the regenerative brake power, the regenerative brake power is also maintained in addition to the rear-wheel wheel cylinder fluid pressure (i.e., the rear-wheel fluid pressure brake power).

The feature of the vehicle brake control apparatus according to the present invention is that the apparatus further includes the additional brake power generating means for increasing brake power applied to the front wheels by increasing the regenerative brake power applied to the front wheels and/or the pressuring fluid pressure brake power applied to the front wheels which are controlled so as to adjust the compensation brake power by the regenerative and cooperative brake controlling means when the operation of the brake operating member demands the braking power larger than that at the start of the front/rear brake power proportion controlling (i.e., the additional depression) during the controlling the front/rear brake power proportion.

As a result, when the brake-pedal is additionally depressed during the controlling the front/rear brake power proportion, the brake power applied to the front wheels can be increased (in comparison to the case where the controlling the front/rear brake power proportion is not executed). Hence, the shortage of the brake power applied to the rear wheels generated when the brake-pedal is additionally depressed during the controlling the front/rear brake power proportion (i.e., the shortage of the total brake power) can be compensated. Consequently, characteristics of the total brake power relative to the operation of the brake operating member can be matched with target characteristics set in advance, maintaining the optimum brake power to the operation of the brake operating member.

In this case, it is preferable that the additional brake power be determined, which is an increase in brake power applied to the front wheels generated by increasing the regenerative brake power applied to the front wheels and/or the pressuring fluid pressure brake power applied to the front wheels, on the basis of a shortage of brake power applied to the rear wheels, which is generated by the prohibition of the increase in brake power applied to the rear wheels due to the front/rear brake power proportion controlling, relative to a value corresponding to the operation of the brake operating member when the front/rear brake power proportion controlling is not executed (referred to as the rear-wheel brake power shortage below). The additional brake power herein can be established to be the same value as that of the rear-wheel brake power shortage or to the value obtained by multiplying the rear-wheel brake power shortage by a predetermined coefficient (positive coefficient less than "1", for example).

Thereby, when the additional brake power is set to have the same value as the rear-wheel brake power shortage, the rear-wheel brake power shortage is precisely compensated with the additional brake power applied to the front wheels even if the rear-wheel brake power shortage is generated by additionally depressing the brake-pedal during the controlling the front/rear brake power proportion.

Accordingly, the total brake power has the same value as that when the front/rear brake power proportion is not controlled. That is, characteristics of the total brake power relative to the operation of the brake operating member can be precisely matched with the target characteristics.

Preferably, the vehicle brake control apparatus according to the present invention further includes allowable maximum regenerative brake power determining means for determining allowable maximum regenerative brake power, which is an allowable maximum value of the regenerative brake power applied to the front wheels, corresponding to a state of the vehicle, wherein when the determined additional brake power does not exceed a margin of the regenerative brake power applied to the front wheels, which is controlled for adjusting the compensation brake power by the regenerative and cooperative brake controlling means, relative to the allowable maximum regenerative brake power, (referred to as the regenerative brake power margin below), the additional brake power generating means is constructed so as to generate the determined additional brake power by increasing the regenerative brake power applied to the front wheels by the additional brake power.

Thereby, when the brake-pedal is additionally depressed during the controlling the front/rear brake power proportion, the regenerative brake power applied to the front wheels is increased by the determined additional brake power, so that the additional brake power is generated in the front wheels. That is, the regenerative brake power for generating the additional brake power is used as much as possible. Hence, even when the determined additional brake power does not exceed the regenerative brake power margin, the electric energy generated by the motor can be recovered to the battery to the utmost.

Preferably, the vehicle brake control apparatus according to the present invention further includes the above-mentioned allowable maximum regenerative brake power determining means mentioned above, wherein when the determined additional brake power exceeds the regenerative brake power margin, the additional brake power generating means is constructed so as to generate the determined additional brake power by increasing the regenerative brake power applied to the front wheels to the allowable maximum regenerative brake power as well as by increasing the pressuring fluid pressure brake power applied to the front wheels by a shortage of the regenerative brake power margin relative to the determined additional brake power.

Thereby, when the brake-pedal is additionally depressed during the controlling the front/rear brake power proportion, the regenerative brake power applied to the front wheels is increased to the allowable maximum regenerative brake power while the pressuring fluid pressure brake power applied to the front wheels is increased by the shortage of the regenerative brake power margin relative to the determined additional brake power, so that the additional brake power is generated in the front wheels. That is, the regenerative brake power is used to the utmost for generating the additional brake power. Hence, even when the determined additional brake power exceeds the regenerative brake power margin, the electric energy generated by the motor can be recovered to the battery to the utmost.

In addition, when the brake-pedal is additionally depressed during the controlling the front/rear brake power proportion, in the case where the regenerative brake power margin is "0" (i.e., the regenerative brake power applied to the front wheels has the same value as that of the allowable maximum regenerative brake power), the additional brake power is generated in the front wheels by increasing the pressuring fluid pressure brake power applied to the front wheels by the determined additional brake power.

Preferably, in the vehicle brake control apparatus according to the present invention, when the compensation brake power for matching characteristics of the total brake power relative to the operation of the brake operating member with target characteristics set in advance do not exceed the allowable maximum regenerative brake power, the regenerative and cooperative brake controlling means generates the compensation brake power by generating the regenerative brake power so that the value of the regenerative brake power become equal to the value of the compensation brake power.

Preferably, when the compensation brake power for matching characteristics of the total brake power relative to the operation of the brake operating member with target characteristics set in advance exceeds the allowable maximum regenerative brake power, the regenerative and cooperative brake controlling means generates the compensation brake power by generating the regenerative brake power at its maximum value and by generating the pressuring fluid pressure brake power so that the value of the pressuring fluid pressure brake power become equal to the value by which the compensation brake power exceeds the maximum regenerative brake power. As a result, when the controlling of the front/rear brake power proportion is not executed, the electric energy generated by the motor can be recovered to the battery to the utmost.

The case where the vehicle brake control apparatus according to the present invention is incorporated in the vehicle brake apparatus having the master fluid pressure generating means, the pressuring means, and pressure adjusting means has been described as above. The vehicle brake apparatus incorporated in the vehicle brake control apparatus according to the present invention is not limited to the apparatus having such structures, so that the following apparatuses may be applied.

That is, the vehicle brake control apparatus according to the present invention is applied for vehicles having a motor for driving at least front wheels as a power source, and is also incorporated in a vehicle brake apparatus applied including frictional brake power controlling means for controlling frictional brake power applied to wheels of the vehicle independently of the operation of a brake operating member by a driver and regenerative brake power controlling means for controlling regenerative brake power generated by the motor.

The frictional brake power applied to wheels controlled by the frictional brake power controlling means herein is a frictional force for braking the wheel, which is generated in a rotational member, integrally with the wheel (a disk rotor, for example), when a frictional member (a brake pad, for example) is pressed on the rotational member. The frictional brake power includes the fluid pressure brake power using fluid pressure in the wheel cylinder as a drive source for the frictional member and the air pressure brake power using the air pressure as a drive source for the frictional member. When the fluid pressure brake power is adopted as the frictional brake power, the frictional brake power controlling means generally includes a fluid pressure pump for generating a fluid pressure higher than that of the fluid pressure corresponding to the operation of the brake operating member (master cylinder fluid pressure) and a plurality of electromagnetic valves for adjusting the wheel cylinder fluid pressure for every wheel.

In this case, the vehicle brake control apparatus according to the present invention includes the above-mentioned front/rear brake power proportion controlling means, the below-mentioned regenerative and cooperative brake controlling means, and the below-mentioned additional brake power generating means.

The regenerative and cooperative brake controlling means is constructed to adjust the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance.

The additional brake power generating means is constructed to increase brake power applied to the front wheels by increasing the regenerative brake power applied to the front wheels and/or the frictional brake power applied to the front wheels which are controlled by the regenerative and cooperative brake controlling means when the operation of the brake operating member demands the braking power larger than that at the start of the front/rear brake power proportion controlling during the controlling the front/rear brake power proportion.

In such a manner, when the brake-pedal is additionally depressed during the controlling the front/rear brake power proportion, by increasing the regenerative brake power applied to the front wheels and/or the frictional brake power applied to the front wheels controlled by the regenerative and cooperative brake controlling means, instead of increasing the regenerative brake power applied to the front wheels and/or the pressuring fluid pressure brake power applied to the front wheels controlled so as to adjust the compensation brake power by the regenerative and cooperative brake controlling means, the above-mentioned rear-wheel brake power shortage (i.e., the total brake power shortage) can be compensated.

In this case, the additional brake power is an increase in brake power applied to the front wheels generated by increasing the regenerative brake power applied to the front wheels and/or the frictional brake power applied to the front wheels. In this case, preferably, the additional brake power generating means is constructed so as to generate the determined additional brake power by increasing the regenerative brake power applied to the front wheels by the additional brake power when the determined additional brake power does not exceed a margin of the regenerative brake power applied to the front wheels, which is controlled by the regenerative and cooperative brake controlling means, relative to the allowable maximum regenerative brake power, and is constructed so as to generate the determined additional brake power by increasing the regenerative brake power applied to the front wheels to the allowable maximum regenerative brake power as well as by increasing the frictional brake power applied to the front wheels by a shortage of the margin of the regenerative brake power applied to the front wheels relative to the determined additional brake power when the determined additional brake power exceeds the margin of the regenerative brake power applied to the front wheels, which is controlled by the regenerative and cooperative brake controlling means, relative to the allowable maximum regenerative brake power.

Thereby, regardless whether the determined additional brake power exceeds the regenerative brake power margin or not, the electric energy generated by the motor can also be recovered to the battery to the utmost.

DESCRIPTION OF THE PREFERRED EMBODIMENTS

Embodiments of a vehicle brake apparatus (a vehicle brake control apparatus) according to the present invention will be described below with reference to the drawings.

First Embodiment

Figure 1:
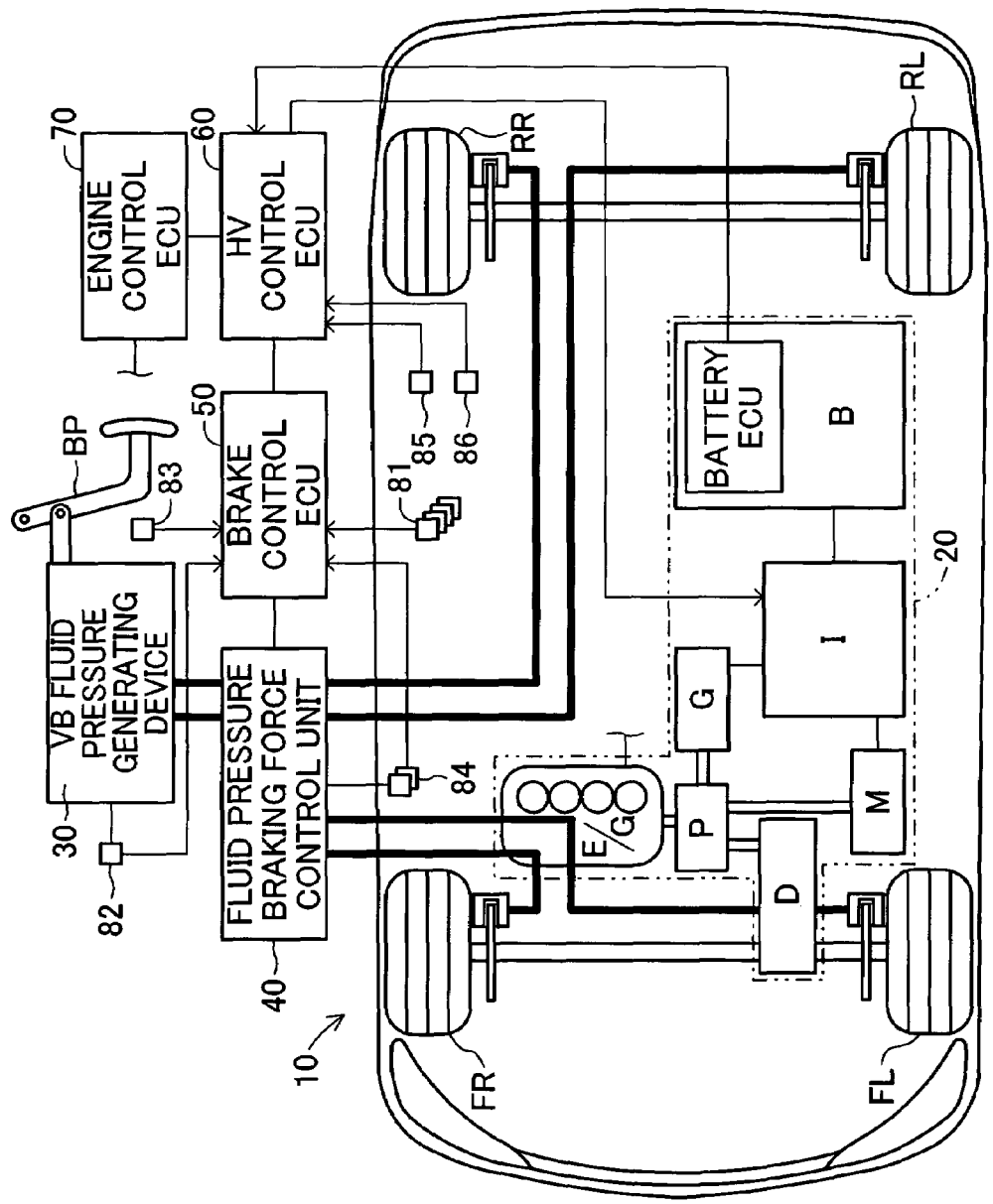
FIG. 1 is a schematic structural view of a vehicle having a vehicle brake apparatus according to a first embodiment of the present invention mounted thereon.

FIG. 1 is a schematic view of a vehicle having a vehicle brake apparatus 10 according to a first embodiment of the present invention mounted thereon. This vehicle, including two brake fluid pressure circuit lines (i.e., so-called front/rear piping) composed of a line for two front wheels and a line for two rear wheels, is a front-wheel drive hybrid vehicle using an engine and a motor together as a power source for driving the front wheels.

The vehicle brake apparatus 10 includes a hybrid system 20 having two kinds of drive source, an engine E/G and a motor M, a vacuum booster fluid pressure generating device generating a brake fluid pressure corresponding to the brake-pedal operation by a driver (referred to as a VB fluid pressure generating device 30 below), a fluid pressure braking force control unit 40 for controlling the fluid pressure braking force (specifically, the wheel cylinder fluid pressure) for each wheel, a brake control ECU 50, a hybrid control ECU (referred to as an HV control ECU 60) and an engine control ECU 70.

The hybrid system 20 includes the engine E/G, the motor M, a generator G, a power dividing mechanism P, a reducer D, an inverter I, and a battery B. The engine E/G is a principal drive source of the vehicle, and according to the embodiment, it is a spark-ignition multi-cylinder (four-cylinder) internal combustion engine.

The motor M is an AC synchronous motor as an auxiliary drive source functioning also as a generator for generating a regenerative braking force during a brake-pedal BP operation by a driver. The generator G is also AC synchronous like the motor M, and is driven by the engine E/G so as to generate AC power (AC current) for charging the battery B or for driving the motor M.

The power dividing mechanism P is constructed of a planetary gear train and is connected to the engine E/G, the motor M, the generator G, and the reducer D. The power dividing mechanism P has a function to switch a power transmission route (and direction). That is, the power dividing mechanism P can transmit the driving power of the engine E/G and the driving power of the motor M to the reducer D. Thereby, the driving power of both the sources is transmitted to two front wheels via the reducer D and a front-wheel power transmission system (not shown) so as to drive the two front wheels.

The power dividing mechanism P can also transmit the driving power of the engine E/G to the generator G, thereby driving the generator G. Furthermore, during the brake-pedal BP operation, the power dividing mechanism P can transmit the power from the reducer D (i.e., the two front wheels, which are driving wheels) to the motor M, so that the motor M is driven as a generator for generating the regenerative braking force.

The inverter I is connected to the motor M, the generator G, and the battery B. The inverter I converts DC electric power supplied from the battery B (high-voltage DC current) into AC electric power (AC current) for driving the motor M so as to supply the converted AC electric power to the motor M, thereby driving the motor M. The inverter I also converts the AC electric power generated by the generator G into AC electric power for driving the motor M so as to supply the converted AC electric power to the motor M. Thereby, the motor M can also be driven.

The inverter I also converts the AC electric power generated by the generator G into DC electric power so as to supply it to the battery B. When the state of charge (referred to as "SOC" below) of the battery B is reduced, the battery B can be thereby charged.

Furthermore, the inverter I converts the AC electric power generated by the motor M driven as a generator during the brake-pedal BP operation (generating the regenerative braking force) into DC electric power so as to supply it to the battery B. The kinetic energy of the vehicle can be thereby converted into electric energy so as to be recovered (charged) into the battery B. In this case, with increasing electric generating resistance by the motor M (i.e., the regenerative braking force), the electric power charged into the battery B increases.

Figure 2:
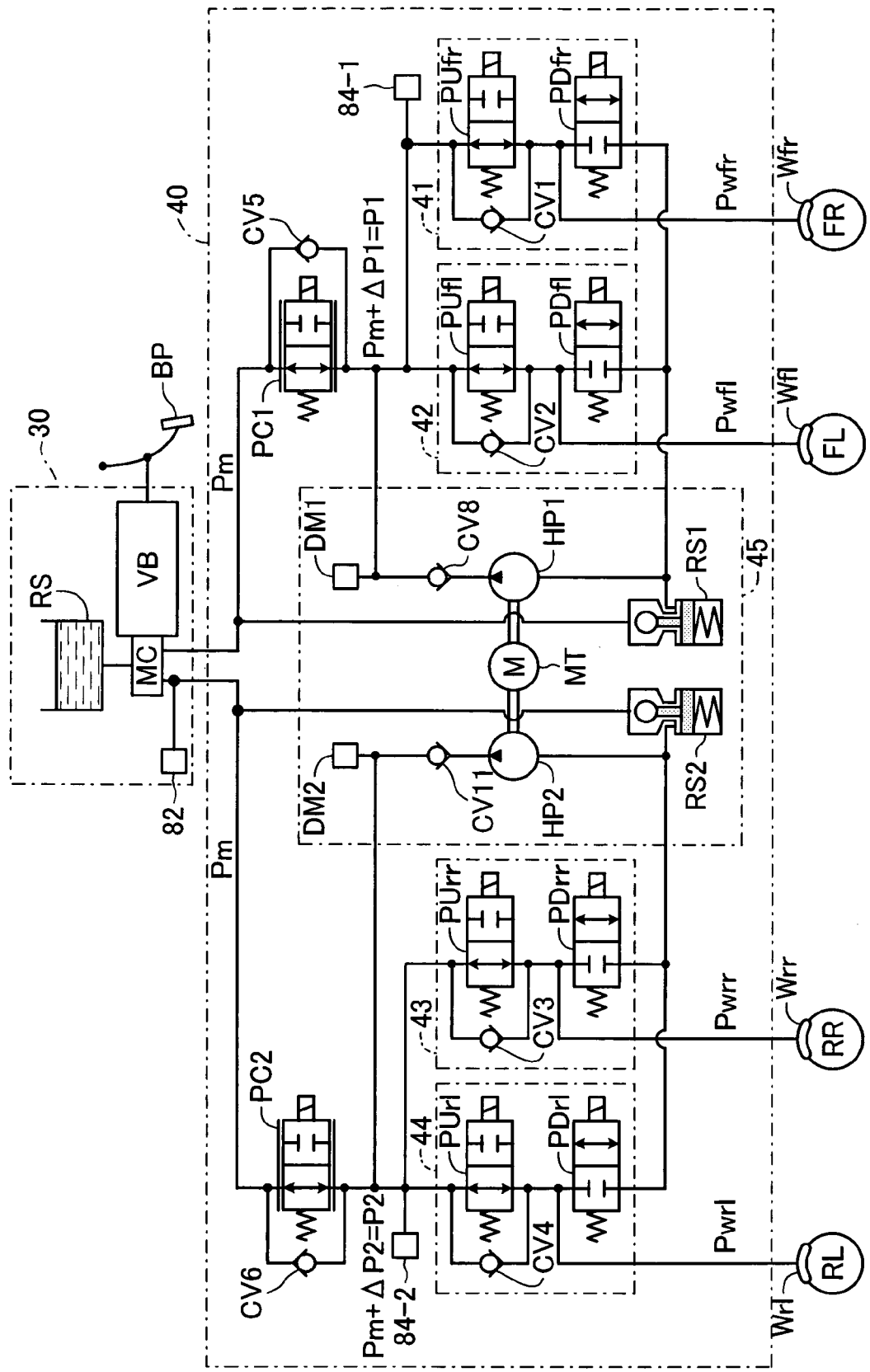
FIG. 2 is a schematic structural view of a vacuum booster fluid pressure generating device and fluid pressure brake power control units shown in FIG. 1.

A VB fluid pressure generating device 30, as shown in the schematic view of FIG. 2, includes a vacuum booster VB that operates to correspond to the brake-pedal BP operation and a master cylinder MC connected to the vacuum booster VB. The vacuum booster VB helps an operating force of the brake-pedal BP at a predetermined rate using the air pressure (negative pressure) in a suction pipe of the engine E/G so as to transmit the operating force helped to the master cylinder MC.

The master cylinder MC, including two output-port lines composed of a first port belonging to a line involved in two front wheels FR and FL and a second port belonging to a line involved in two rear wheels RR and RL, generates a first VB fluid pressure Pm (master fluid pressure) corresponding to the helped operating force from the first port by receiving brake fluid from a reservoir RS while generating a second VB fluid pressure Pm (master fluid pressure) with approximately the same pressure as that of the first VB fluid pressure Pm from the second port.

The structures and the operation of the master cylinder MC and the vacuum booster VB are known, so that the detailed description therefor is omitted herein. In such a manner, the master cylinder MC and the vacuum booster VB generate the first and second VB fluid pressures (master fluid pressures) corresponding to the operation force of the brake-pedal BP, respectively. The VB fluid pressure generating device 30 is equivalent to master fluid pressure generating means.

The fluid pressure braking force control unit 40, as shown in the schematic view of FIG. 2, includes an FR brake fluid pressure adjustment unit 41 for adjusting the pressure of brake fluid supplied to wheel cylinders Wfr, Wfl, Wrr, and Wrl provided in wheels FR, FL, RR, and RL, respectively; an FL brake fluid pressure adjustment unit 42; an RR brake fluid pressure adjustment unit 43; an RL brake fluid pressure adjustment unit 44; and a return current brake fluid supply unit 45.

Between the first port of the master cylinder MC and the upstream portions of the FR brake fluid pressure adjustment unit 41 and the FL brake fluid pressure adjustment unit 42, a normally open linear electromagnetic valve PC1 is arranged as pressure adjusting means. Similarly, between the second port of the master cylinder MC and the upstream portions of the RR brake fluid pressure adjustment unit 43 and the RL brake fluid pressure adjustment unit 44, a normally open linear electromagnetic valve PC2 is arranged as pressure adjusting means. The normally open linear electromagnetic valves PC1 and PC2 will be described in detail.

The FR brake fluid pressure adjustment unit 41 is composed of a booster valve PUfr, which is a two-port two-position selector type normally open electromagnetic valve, a pressure reducing valve PDfr, which is a two-port two-position selector type normally close electromagnetic valve. The booster valve PUfr connects/disconnects between the upstream portion of the FR brake fluid pressure adjustment unit 41 and the wheel cylinder Wfr. The pressure reducing valve PDfr connects/disconnects between the wheel cylinder Wfr and a reservoir RS1. As a result, by controlling the booster valve PUfr and the pressure reducing valve PDfr, the brake fluid pressure in the wheel cylinder Wfr (the wheel cylinder fluid pressure Pwfr) can be increased, held, or reduced in pressure.

In addition, a check valve CV1 is connected to the booster valve Pufr in parallel therewith for allowing the brake fluid to flow only in one direction from the wheel cylinder Wfr toward the upstream of the FR brake fluid pressure adjustment unit 41. Thereby, when the operated brake-pedal BP is released, the wheel cylinder fluid pressure Pwfr is rapidly reduced.

Similarly, the FL brake fluid pressure adjustment unit 42, the RR brake fluid pressure adjustment unit 43, and the RL brake fluid pressure adjustment unit 44 are composed of a booster valve Pufl and a pressure reducing valve PDflr; a booster valve Purr and a pressure reducing valve PDrr; and a booster valve Purl and a pressure reducing valve PDrl, respectively. By controlling these booster valves and pressure reducing valves, the brake fluid pressure in the wheel cylinders Wfl, Wrr, and Wrl (the wheel cylinder fluid pressures Pwfl, Pwrr, and Pwrl) can be increased, held, or reduced in pressure, respectively. Also, to the booster valves Pufl, Purr, and Purl, check valves CV2, CV3, and CV4 having the same function as that of the check valve CV1 are connected in parallel therewith, respectively.

The return current brake fluid supply unit 45 includes a DC motor MT and two fluid pressure pumps (gear pumps) HP1 and HP2 simultaneously driven by the DC motor MT as pressuring means. The fluid pressure pump HP1 pumps up the brake fluid contained in a reservoir RS1 and returned from the pressure reducing valves PDfr and PDfl so as to supply it to the upstream portions of the FR brake fluid pressure adjustment unit 41 and the FL brake fluid pressure adjustment unit 42 via a check valve CV8.

Similarly, the fluid pressure pump HP2 pumps up the brake fluid contained in a reservoir RS2 and returned from the pressure reducing valves PDrr and PDrl so as to supply it to the upstream portions of the RR brake fluid pressure adjustment unit 43 and the RL brake fluid pressure adjustment unit 44 via a check valve CV11. In order to reduce the pulsation in output pressure of the fluid pressure pumps HP1 and HP2, dampers DM1 and DM2 are provided along fluid pressure circuits between the check valve CV8 and the normally open linear electromagnetic valve PC1, and between the check valve CV11 and the normally open linear electromagnetic valve PC2, respectively.

Then, the normally open linear electromagnetic valve PC1 (pressure adjusting means) will be described. To the valve body of the normally open linear electromagnetic valve PC1, while an opening direction force due to an urging force of a coil spring (not shown) being usually applied, an opening direction force due to the pressure difference obtained by subtracting the first VB fluid pressure Pm from the pressure in the upstream portions of the FR brake fluid pressure adjustment unit 41 and the FL brake fluid pressure adjustment unit 42 (the pressurizing amount to the master fluid pressure, referred to as a liner valve pressure difference $\Delta P1$ below), and a closing direction force due to the attraction increasing in proportion to an electric current (i.e., an instruction electric current Id) applied to the normally open linear electromagnetic valve PC1 are applied.

Figure 3:
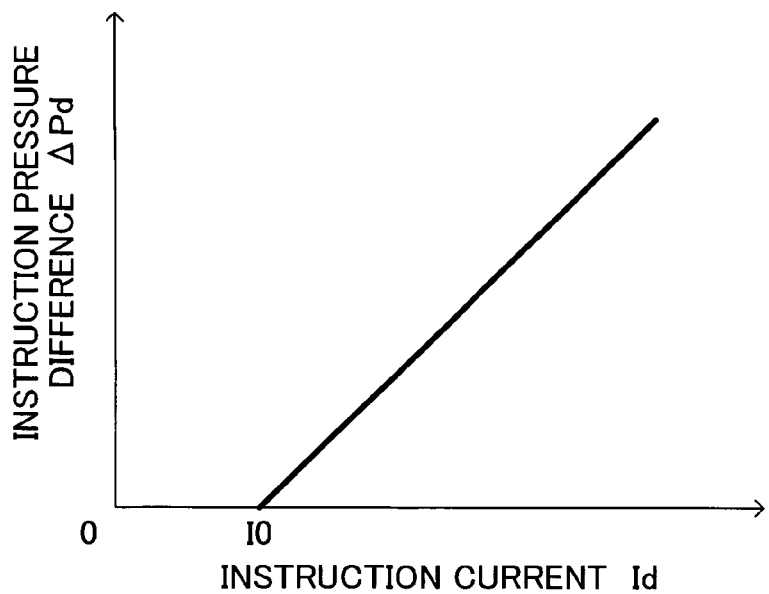
FIG. 3 is a graph showing the relationship of a normally open linear electromagnetic valve shown in FIG. 2 between an instruction current and an instruction pressure difference.

Consequently, as shown in FIG. 3, an instruction pressure difference $\Delta Pd$ equivalent to the above-mentioned attraction is determined so as to increase in proportion to the instruction electric current Id. Numeral 10 denotes an electric current value equivalent to the urging force of the coil spring. The normally open linear electromagnetic valve PC1 is closed when the instruction pressure difference $\Delta Pd$ (specifically, a front-wheel instruction pressure difference $\Delta Pdf$) is larger than the liner valve pressure difference $\Delta P1$ so as to disconnect the connection between the first port of the master cylinder MC and the upstream portions of the FR brake fluid pressure adjustment unit 41 and the FL brake fluid pressure adjustment unit 42.

On the other hand, the normally open linear electromagnetic valve PC1 is opened when the front-wheel instruction pressure difference $\Delta Pdf$ is smaller than the liner valve pressure difference $\Delta P1$ so as to connect between the first port of the master cylinder MC and the upstream portions of the FR brake fluid pressure adjustment unit 41 and the FL brake fluid pressure adjustment unit 42. As a result, the brake fluid in the upstream portions of the FR brake fluid pressure adjustment unit 41 and the FL brake fluid pressure adjustment unit 42 (supplied from the fluid pressure pump HP1) flows toward the first port of the master cylinder MC via the normally open linear electromagnetic valve PC1, so that the liner valve pressure difference $\Delta P1$ is adjusted so as to agree with the front-wheel instruction pressure difference $\Delta Pdf$. The brake fluid flowing into the first port of the master cylinder MC is returned to the reservoir RS1.

In other words, when the DC motor MT (i.e., the fluid pressure pumps HP1 and HP2) is driven, in accordance with the instruction electric current Id (Idf) to the normally open linear electromagnetic valve PC1, the liner valve pressure difference $\Delta P1$ (the allowable maximum value thereof) is controlled. At this time, the pressure in the upstream portions of the FR brake fluid pressure adjustment unit 41 and the FL brake fluid pressure adjustment unit 42 becomes the value calculated by adding the liner valve pressure difference $\Delta P1$ to the first VB fluid pressure Pm (Pm+$\Delta P1$) (may be referred to as a control fluid pressure P1).

On the other hand, when the normally open linear electromagnetic valve PC1 is non-magnetized (i.e., the instruction electric current Idf is set at "0"), the normally open linear electromagnetic valve PC1 is held open by the urging force of the coil spring. At this time, the liner valve pressure difference $\Delta P1$ is "0" so that the pressure in the upstream portions of the FR brake fluid pressure adjustment unit 41 and the FL brake fluid pressure adjustment unit 42 (i.e., the control fluid pressure P1) equals to the first VB fluid pressure Pm.

The normally open linear electromagnetic valve PC2 is the same in structure and operation as the normally open linear electromagnetic valve PC1. Hence, if the pressure difference obtained by subtracting the second VB fluid pressure Pm from the pressure in the upstream portions of the RR brake fluid pressure adjustment unit 43 and the RL brake fluid pressure adjustment unit 44 (the pressurizing amount to the master fluid pressure) is referred to as a liner valve pressure difference $\Delta P2$, when the DC motor MT (i.e., the fluid pressure pumps HP1 and HP2) is driven, the pressure in the upstream portions of the RR brake fluid pressure adjustment unit 43 and the RL brake fluid pressure adjustment unit 44 depends on the instruction electric current Id (Idr) to the normally open linear electromagnetic valve PC2 so as to become the value (Pm+$\Delta P2$) (may be referred to as a control fluid pressure P2) calculated by adding the instruction pressure difference $\Delta Pd$ (specifically, the rear-wheel instruction pressure difference $\Delta Pdr$, i.e., the liner valve pressure difference $\Delta P2$) to the second VB fluid pressure Pm. On the other hand, when the normally open linear electromagnetic valve PC2 is non-magnetized, the pressure in the upstream portions of the RR brake fluid pressure adjustment unit 43 and the RL brake fluid pressure adjustment unit 44 (i.e., the control fluid pressure P2) equals to the second VB fluid pressure Pm.

In addition, a check valve CV5 is connected to the normally open linear electromagnetic valve PC1 in parallel therewith for allowing the brake fluid to flow only in one direction from the first port of the master cylinder MC toward the upstream portions of the FR brake fluid pressure adjustment unit 41 and the FL brake fluid pressure adjustment unit 42. Thereby, even when the liner valve pressure difference $\Delta P1$ is controlled in accordance with the instruction electric current Idf to the normally open linear electromagnetic valve PC1, when the first VB fluid pressure Pm is larger than the pressure in the upstream portions of the FR brake fluid pressure adjustment unit 41 and the FL brake fluid pressure adjustment unit 42 by operating the brake-pedal BP, the brake fluid pressure (i.e., the first VB fluid pressure Pm) itself corresponding to the operating force of the brake-pedal BP is supplied to the wheel cylinders Wfr and Wfl. Also, to the normally open linear electromagnetic valve PC2, a check valve CV6 having the same function as that of the check valve CV5 is connected in parallel therewith.

As described above, the fluid pressure braking force control unit 40 is constructed of so-called front/rear piping composed of a line for two front wheels FR and FL and a line for two rear wheels RR and RL. In the fluid pressure braking force control unit 40, when all the electromagnetic valves are in a non-magnetized state, the brake fluid pressures corresponding to the operating force of the brake-pedal BP (i.e., the first and second VB liquid pressures Pm, the master fluid pressures) are supplied to the wheel cylinders W**.

Symbol "" attached at the end of various variables is a generic designator of symbols, such as "fl" and "fr", for showing that to any of wheels, the variable belongs. For example, the wheel cylinders W comprehensively designate the left front wheel cylinder Wfl, the right front wheel cylinder Wfr, the left rear wheel cylinder Wrl, and the right rear wheel cylinder Wrr.

On the other hand, in this state, when the DC motor MT (i.e., the fluid pressure pumps HP1 and HP2) is driven as well as the normally open linear electromagnetic valve PC1 is excited with the instruction electric current Idf, the fluid pressure braking force control unit 40 applies the brake fluid pressure (the control fluid pressure P1) which is higher than the first VB liquid pressure Pm by a front wheel instruction pressure difference $\Delta Pdf$ (=$\Delta P1$) determined to correspond to the instruction electric current Idf to the wheel cylinders Wfr and Wfl. Similarly, the fluid pressure braking force control unit 40 applies the brake fluid pressure (the control fluid pressure P2) which is higher than the second VB liquid pressure Pm by a rear wheel instruction pressure difference $\Delta Pdr$ (=$\Delta P2$) determined to correspond to the instruction electric current Idr to the wheel cylinders Wrr and Wrl.

In addition, the fluid pressure braking force control unit 40 can individually adjust the wheel cylinder fluid pressures Pw by controlling the booster valves PU and the pressure reducing valves PD. That is, the fluid pressure braking force control unit 40** can individually adjust the braking forces applied to the wheels for each wheel, regardless of the brake-pedal BP operation by a driver.

Thus, by the instruction from the brake control ECU50, the fluid pressure braking force control unit 40 can achieve known antiskid controls, vehicle stabilizing controls (specifically, understeer suppressing controls and oversteer suppressing controls), and vehicle spacing controls in addition to front/rear brake power distribution controls which will be described later.

Referring back to FIG. 1, the brake control ECU50, an HV control ECU60, an engine control ECU70, and a battery ECU built in the battery B are microcomputers, each including a CPU, a program executed by the CPU, tables (a look-up table and a map), an ROM having constants stored in advance, an RAM in which data are temporarily stored by the CPU on demand, a backup RAM for storing data when the power source is turned on as well as for holding the stored data even when the power source is turned off, and interfaces including an AD converter. The HV control ECU60 is connected to the brake control ECU50, the engine control ECU70, and the battery ECU so as to be able to cancel the communication.

The brake control ECU50 is connected to wheel speed sensors 81\*, a VB fluid pressure sensor 82 (see FIG. 2), a brake-pedal depressing force sensor 83, and wheel cylinder fluid pressure sensors 84-1 and 84-2 (see FIG. 2).

The wheel speed sensors 81fr, 81fl, 81rr, and 81rl are electromagnetic pick-up sensors outputting signals with frequencies respectively corresponding to wheel speeds of the wheels FR, FL, RR, RR, and RL. The VB fluid pressure sensor 82 detects a second VB fluid pressure so as to output a signal showing the second VB liquid pressure Pm. The brake-pedal depressing force sensor 83 detects the brake-pedal depressing force by a driver so as to output a signal showing a brake-pedal depressing force Fp. The wheel cylinder fluid pressure sensors 84-1 and 84-2 detect the control fluid pressures P1 and P2 so as to output signals showing the control fluid pressures P1 and P2, respectively.

The brake control ECU50 receives signals from the sensors 81 to 84 and feeds drive signals to the electromagnetic valves and the motor MT of the fluid pressure braking force control unit 40. The brake control ECU50, as will be described later, feeds a signal showing a request regenerative braking force Fregt, which is a front wheel regenerative braking force to be output in the present operating state during the brake-pedal BP operation, to the HV control ECU60.

The HV control ECU60 is connected to an accelerator travel sensor 85 and a shift position sensor 86. The accelerator travel sensor 85 detects an operation travel of an accelerator pedal (not shown) operated by a driver so as to output a signal showing the operation travel of the accelerator pedal Accp. The shift position sensor 86 detects a shift position of a shift layer (not shown) so as to output a signal showing the shift position.

The HV control ECU60 receives signals from the sensors 85 and 86 so as to calculate a request output value and a request torque value of the engine E/G corresponding to driving conditions on the basis of these signals. The HV control ECU60 feeds the request output value of the engine E/G to the engine control ECU70. Thereby, the engine control ECU70 controls a valve travel of a throttle valve (not shown) on the basis of the request output value of the engine E/G. As a result, the driving force of the engine E/G is controlled.

The HV control ECU60 also feeds a signal for controlling AC electric power to be supplied to the motor M to the inverter I on the basis of the request torque value of the engine E/G. The driving force of the motor M is thereby controlled.

The HV control ECU60 also receives a signal showing the SOC (state of charge) from the battery ECU, and feeds a signal to the inverter I for controlling the AC electric power generated by the generator G when the SOC is reduced. The AC electric power generated by the generator G is thereby converted into DC electric power so as to be charged in the battery B.

Furthermore, during the operation of the brake-pedal BP, the HV control ECU60 calculates an allowable maximum regenerative brake power Fregmax, which is the maximum value of the front-wheel regenerative brake power allowable at the present, from the value of the SOC and the vehicle speed (a below-mentioned estimated vehicle speed Vso) based on the output of the wheel speed sensors 81\*. The HV control ECU60 calculates an actual maximum regenerative brake power Fregact, which is the front-wheel regenerative brake power to be generated in practice, on the basis of the allowable maximum regenerative brake power Fregmax and the request regenerative braking force Fregt fed from the brake control ECU50.

Then, the HV control ECU60 feeds a signal showing the actual regenerative brake power Fregact to the brake control ECU50, and also feeds a signal for controlling the AC electric power to be supplied to the motor M based on the actual regenerative brake power Fregact to the inverter I. Thereby, the regenerative brake power Freg by the motor M is controlled to agree with the actual maximum regenerative brake power Fregact. In such a manner, means for controlling the regenerative brake power is equivalent to regenerative brake power controlling means.

(Outline of Regenerative Cooperative Controls)

Next, the outline of regenerative cooperative controls executed by the vehicle brake apparatus 10 according to the first embodiment of the present invention (referred to as the apparatus below) will be described. In vehicles, characteristics of the entire braking force applied to the vehicle (the sum of the braking force applied to the front wheels and the braking force applied to the rear wheels) relative to a brake-pedal depressing force Fp generally have target characteristics.

Figure 4:
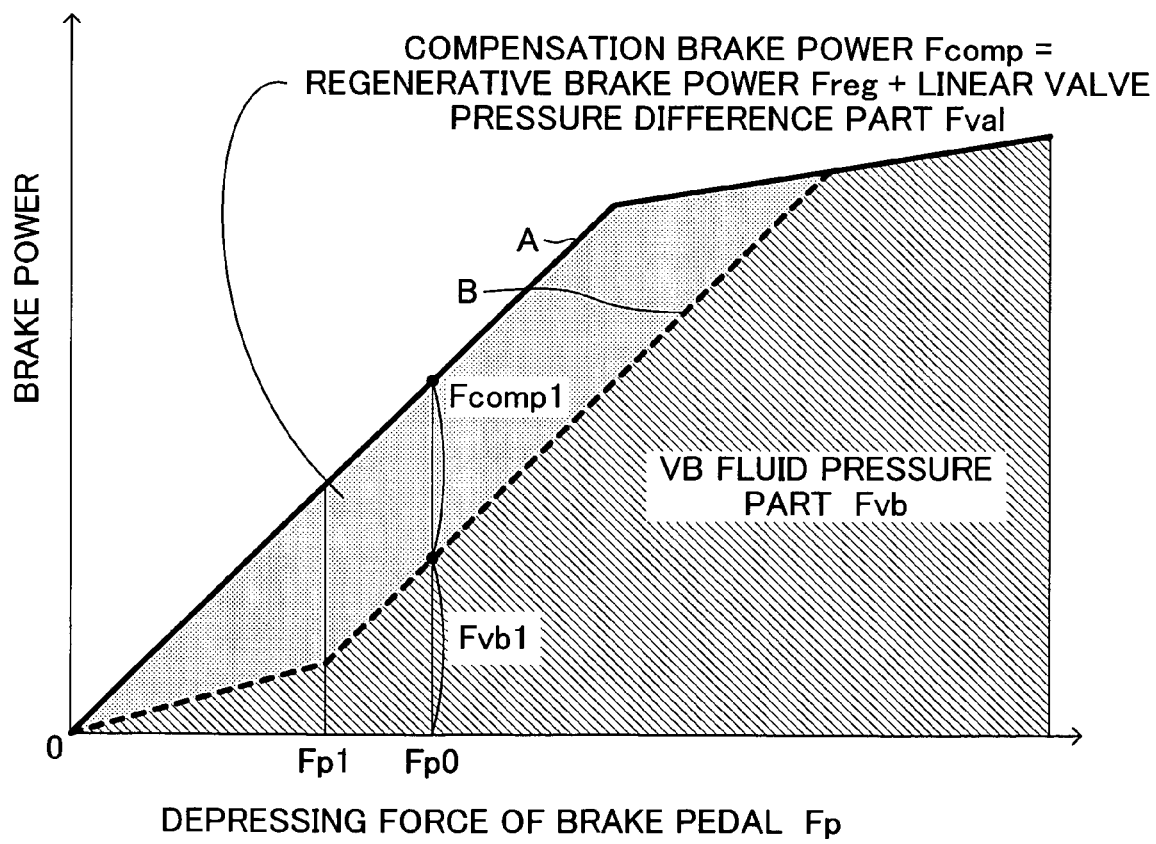
FIG. 4 is a graph showing characteristics of fluid pressure brake power (a VB fluid pressure part) based on a vacuum fluid pressure versus a brake pedal depressing force when the vehicle brake apparatus shown in FIG. 1 is applied, and target characteristics of total brake power versus the brake pedal depressing force.

Solid line A of FIG. 4 shows target characteristics of the entire brake power of the vehicle shown in FIG. 1 versus the brake-pedal depressing force Fp. On the other hand, broken line B of FIG. 4 shows characteristics of the fluid pressure brake power (the master fluid pressure brake power referred to as "VB fluid pressure part Fvb") on the basis of the VB fluid pressures output from the master cylinder MC of the apparatus (specifically, the first and second VB liquid pressures Pm) versus the brake-pedal depressing force Fp.

As is apparent from the comparison between solid line A and broken line B, in the apparatus, boosting characteristics of the vacuum booster VB are established so that the VB fluid pressure part Fvb relative to the brake-pedal depressing force Fp has a value intentionally lower than the target value by a predetermined amount.

Then, in the apparatus, by compensating a shortage of the VB fluid pressure part Fvb in the target value with compensation brake power Fcomp, characteristics of the entire brake power (Fvb+Fcomp), which is the sum of the VB fluid pressure part Fvb and the compensation brake power Fcomp, versus the brake-pedal depressing force Fp are matched with the target characteristics shown with solid line A of FIG. 4.

The compensation brake power Fcomp is the sum of the front-wheel regenerative brake power Freg and a linear valve pressure difference part Fval (pressuring fluid pressure brake power). The linear valve pressure difference part Fval herein means the sum of increases in the fluid pressure brake power relative to the liner valve pressure differences API and AP2 for each wheel. Specifically, the linear valve pressure difference part Fval is a total value of the sum of increases in the fluid pressure brake power of the wheels FR and FL due to the increase of the wheel cylinder fluid pressures Pwfr and Pwfl by the liner valve pressure difference ΔP1 from the first VB liquid pressure Pm and the sum of increases in the fluid pressure brake power of the wheels RR and RL due to the increase of the wheel cylinder fluid pressures Pwrr and Pwrl by the liner valve pressure difference AP2 from the second VB liquid pressure Pm.

Furthermore, the allocation of the regenerative brake power Freg in the compensation brake power Fcomp is established so as to increase as larger as possible. Specifically, at first, on the basis of the brake-pedal depressing force Fp, the apparatus obtains the compensation brake power Fcomp necessary for bringing the entire brake power (Fvb+Fcomp) to conform with the target value (the value on solid line A versus the brake-pedal depressing force Fp). For example, as shown in FIG. 4, when the brake-pedal depressing force Fp is a value Fp0, the compensation brake power Fcomp is set at the value Fcomp1. The above-mentioned request regenerative braking force Fregt is set at this value in principle.

The apparatus establishes the actual maximum regenerative brake power Fregact to have the same value as the request regenerative braking force Fregt when the request regenerative braking force Fregt is less than the allowable maximum regenerative brake power Fregmax. On the other hand, when the request regenerative braking force Fregt is more than the allowable maximum regenerative brake power Fregmax, the apparatus establishes the actual maximum regenerative brake power Fregact to be identical to the allowable maximum regenerative brake power Fregmax. Thereby, the regenerative brake power Freg is set as large as possible as long as it does not exceed the allowable maximum regenerative brake power Fregmax, so that during the operation of the brake-pedal BP, the electric energy generated by the motor M is positively recovered to the battery B.

Then, the apparatus controls the liner valve pressure differences $\Delta P1$ and $\Delta P2$ due to the linear valves PC1 and PC2 so that the value obtained by subtracting the actual maximum regenerative brake power Fregact from the compensation brake power Fcomp (i.e., the request regenerative braking force Fregt) agrees with the linear valve pressure difference part Fval. In this case, the liner valve pressure differences $\Delta P1$ and $\Delta P2$ are controlled to be identical in principle (i.e., $\Delta Pdf=\Delta Pdr=\Delta P1=\Delta P2$).

If the request regenerative braking force Fregt does not exceed the above-mentioned allowable maximum regenerative brake power Fregmax as a result, both the liner valve pressure differences $\Delta P1$ and $\Delta P2$ are controlled to be "0". Consequently, the linear valve pressure difference part Fval becomes "0", so that the compensation brake power Fcomp includes only the regenerative brake power Freg.

The allowable maximum regenerative brake power Fregmax will be added herein. With decreasing the SOC, the allowable maximum regenerative brake power Fregmax is set at a greater value. This is because with decreasing the SOC, the charging allowance of the battery B is increased. The allowable maximum regenerative brake power Fregmax is set to be greater with decreasing rotating speed of the motor M (i.e., the vehicle speed) because of the characteristics of the motor M which is an AC synchronous motor.

In addition, when the rotating speed of the motor M (i.e., the vehicle speed) is very small, the regenerative brake power Freg is difficult to be precisely controlled. On the other hand, the linear valve pressure difference part Fval can be precisely controlled even when the vehicle speed is very small, so that when the vehicle is at a speed less than a predetermined very low speed, like a vehicle immediately before stopping, it is preferable that the regenerative brake power Freg be gradually reduced while the allocation of the linear valve pressure difference part Fval be increased with decreasing vehicle speed. Therefore, in the apparatus, when the vehicle is reduced in speed to be less than a predetermined very low speed, the allowable maximum regenerative brake power Fregmax is gradually reduced with decreasing vehicle speed from the actual regenerative brake power Fregact at that time.

In such a manner, although the ratio between the regenerative brake power Freg and the allowable maximum regenerative brake power Fregmax is changed corresponding to the proportion of the request regenerative braking force Fregt to the allowable maximum regenerative brake power Fregmax, the sum of the regenerative brake power Freg and the linear valve pressure difference part Fval (i.e., the compensation brake power Fcomp) is controlled to agree with the request regenerative braking force Fregt. As a result, characteristics of the total brake power (=Fvb+Fcomp) versus the brake-pedal depressing force Fp are matched with the target characteristics shown by solid line A of FIG. 4.

In such a manner, the brake power applied to front wheels (the front-wheel brake power) is controlled by the fluid pressure brake power composed of the allocation of the VB fluid pressure part Fvb to the front wheels (referred to as the front-wheel VB fluid pressure part Fvbf below) and the allocation of the linear valve pressure difference part Fval to the front wheels (i.e., the increase in fluid pressure brake power with the liner valve pressure difference $\Delta P1$, the front-wheel pressuring fluid pressure brake power), and the regenerative brake power Freg. The brake power applied to rear wheels (the rear-wheel brake power) is controlled only by the fluid pressure brake power composed of the allocation of the VB fluid pressure part Fvb to the rear wheels (referred to as the rear-wheel VB fluid pressure part Fvbr below) and the allocation of the linear valve pressure difference part Fval to the rear wheels (i.e., the increase in fluid pressure brake power with the liner valve pressure difference $\Delta P2$, the rear-wheel pressuring fluid pressure brake power).

Adjusting means for adjusting the compensation brake power Fcomp (specifically, the regenerative brake power Freg and the linear valve pressure difference part Fval) in accordance with the brake-pedal depressing force Fp in such a manner is equivalent to regenerative and cooperative brake controlling means.

(Outline of Front/Rear Brake Power Proportioning Controls)

During the operation of the brake-pedal BP by a driver, if rear wheels are locked ahead of front wheels, vehicle running is generally liable to be unstable. Hence, the apparatus executes front/rear brake power proportioning controls (referred to as EBD controls below) so as to prevent the locking of the rear wheels from generating ahead the front wheels.

Specifically, during the operation of the brake-pedal BP, if the value (referred to as a front/rear wheel speed difference $\Delta VW$ below) obtained by subtracting an average value Vwrave of the rear-wheel speed (below mentioned) from an average value Vwfave of the front-wheel speed (below mentioned) exceeds a predetermined determination reference value $\Delta V$wref1, the apparatus determines that the rear wheels are liable to be locked ahead of the front wheels.

Then, when the apparatus determines that the rear wheels are liable to be locked ahead of the front wheels, by maintaining booster valves Purr and Purl belonging to two rear wheels in a closed state (excited state) while maintaining pressure reducing valves PDrr and PDrl in a closed state (non-excited state), rear wheel cylinder liquid pressures Pwrr and Pwrl are maintained.

Figure 5:
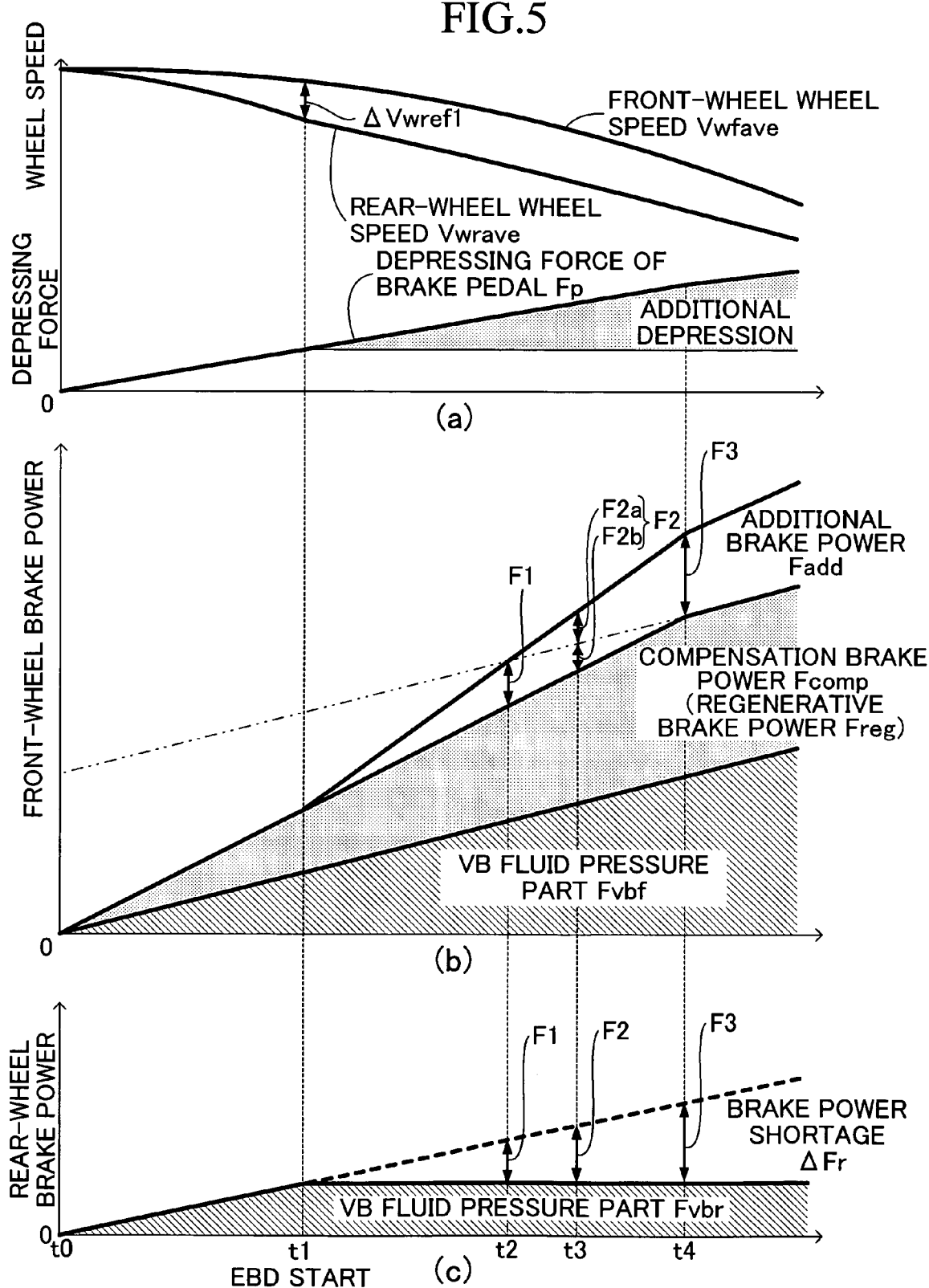
FIGS. 5A to 5C are time charts showing examples of changes in brake pedal depressing force, average value of front-wheel wheel speeds, average value of rear-wheel wheel speeds, front-wheel brake power, and rear-wheel brake power during controlling front/rear brake power proportion when the vehicle brake apparatus shown in FIG. 1 is applied.

FIG. 5A is a time-chart showing an example of changes in the average value Vwfave of the front-wheel speed, the average value Vwrave of the rear-wheel speed, the front-wheel brake power, and the rear-wheel brake power, when the brake-pedal depressing force Fp by a driver is gradually increased from the value "0" at time t0 and the EBD controls are started at time t1 during running of a vehicle at one speed.

FIG. 5B shows a case where the compensation brake power Fcomp includes only the front-wheel regenerative brake power Freg, i.e., the request regenerative braking force Fregt does not exceed the allowable maximum regenerative brake power Fregmax. Two-dot chain line of FIG. 5B shows the allowable maximum regenerative brake power Fregmax. The brake-pedal depressing force Fp is to arrive at the value Fp1 shown in FIG. 4 at time t4.

As shown in FIG. 5A, the brake-pedal depressing force Fp is increased from "0" so that the front-wheel brake power (i.e., the front-wheel VB fluid pressure part Fvbf and the regenerative brake power Freg), as shown in FIG. 5B, is increased from "0" at time t0 (see FIG. 4). Similarly, as shown in FIG. 5C, the rear-wheel brake power (i.e., the rear-wheel VB fluid pressure part Fvbr) is also increased from "0" at time t0 (see FIG. 4).

Consequently, the deceleration of the vehicle gradually increases after time t0. Following this, the load applied to the rear wheels gradually decreases so that front/rear wheel speed difference ΔVW is increased. Then, at time t1, front/rear wheel speed difference ΔVW exceeds the determination reference value ΔVwref1.

As a result, the apparatus starts executing the front/rear brake power distribution controls so as to maintain the booster valves Purr and Purl in a closed state (accordingly, the rear wheel cylinder liquid pressures Pwrr and Pwrl are maintained). As shown in FIG. 5C, after time t1, the rear-wheel brake power is thereby maintained at the value of the front/rear brake power distribution controls at the start time (time t1).

Thus, after time t1, increase in rear-wheel brake power is prohibited so as to prevent the rear wheels from being locked ahead the front wheels. In such a manner, when the rear wheels are determined to tend to be locked ahead the front wheels, means for maintaining the booster valves Purr and Purl in a closed state is equivalent to front/rear brake power distribution controlling means. In this case, the front-wheel brake power (i.e., the front-wheel VB fluid pressure part Fvbf and the regenerative brake power Freg) increases according to the relationship shown in FIG. 4 with increasing brake-pedal BP also after time t1.

(Coping for when the Brake-Pedal is Additionally Depressed During Executing Front/Rear Brake Power Distribution Controls)

As described above, during executing the front/rear brake power distribution controls, the apparatus maintains the rear-wheel brake power at the value of the front/rear brake power distribution controls at the start time. Accordingly, as shown in FIGS. 5A to 5C after time t1, even when the brake-pedal BP is operated for demanding the brake power larger than that of the brake-pedal operation at the start time of the front/rear brake power distribution controls (i.e., additional depression) (see FIG. 5A), the rear-wheel brake power is maintained at the value of the front/rear brake power distribution controls at the start time (time t1) (see FIG. 5C).

On the other hand, when the front/rear brake power distribution controls are not executed in the case shown in FIGS. 5A to 5C, the rear-wheel brake power (i.e., the rear-wheel VB fluid pressure part Fvbr) increases also after t1 with increasing brake-pedal depressing force Fp according to the relationship shown in FIG. 4, as shown in broken line of FIG. 5C. That is, in this case, after the additional depression (after t1), the rear-wheel brake power is insufficient by the rear-wheel brake power shortage ΔFr shown in FIG. 5C in comparison with the case where the front/rear brake power distribution controls are not executed.

Hence, the total brake power (the sum of the front-wheel brake power and the rear-wheel brake power) after the additional depression (after time t1) is also insufficient by the rear-wheel brake power shortage ΔFr in comparison with the case where the front/rear brake power distribution controls are not executed. This means that characteristics of the total brake power versus the brake-pedal depressing force Fp are insufficient to the target characteristics shown by solid line A of FIG. 4 so as not to maintain the optimum brake power relative to the brake-pedal depressing force Fp. From the above, if the brake-pedal is additionally depressed during executing the front/rear brake power distribution controls, it is preferable that the shortage of the rear-wheel brake power (i.e., the total brake power) be compensated.

Then, when the brake-pedal is additionally depressed during executing the front/rear brake power distribution controls, the apparatus generates additional brake power Fadd with the same magnitude as that of the rear-wheel brake power shortage ΔFr in addition to the front-wheel VB fluid pressure part Fvbf and the compensation brake power Fcomp.

The additional brake power Fadd is generated by increasing the regenerative brake power Freg and/or the liner valve pressure difference ΔP1 (i.e., the pressuring fluid pressure brake power applied to the front wheels). Furthermore, the regenerative brake power Freg is preferentially used as the additional brake power Fadd.

More specifically, like from time t1 to time t2 shown in FIGS. 5A to 5C, when the additional brake power Fadd does not exceed the margin of the regenerative brake power Freg relative to the allowable maximum regenerative brake power Fregmax (i.e., the regenerative brake power margin), the apparatus increases the front-wheel brake power by the magnitude of the additional brake power Fadd by increasing the regenerative brake power Freg by the additional brake power Fadd.

In this case, the additional brake power Fadd is generated only from increase in regenerative brake power Freg. For example, at time t2 of FIGS. 5A to 5C, the regenerative brake power Freg is increased by a value F1 from the value determined by the relationship shown in FIG. 4. As a result, the regenerative brake power Freg agrees with the allowable maximum regenerative brake power Fregmax.

Like from time t2 to time t4 shown in FIGS. 5A to 5C, when the regenerative brake power margin is more than "0" and the additional brake power Fadd exceeds the regenerative brake power margin, the apparatus increases the front-wheel brake power by the additional brake power Fadd by increasing the regenerative brake power Freg to the allowable maximum regenerative brake power Fregmax and by increasing the liner valve pressure difference ΔP1 by the amount equivalent to the shortage of the regenerative brake power margin relative to the additional brake power Fadd.

In this case, the additional brake power Fadd is generated from increases in regenerative brake power Freg and in liner valve pressure difference ΔP1. For example, at time t3 of FIGS. 5A to 5C, the regenerative brake power Freg is increased by a value F2b from the value determined by the relationship shown in FIG. 4 while the liner valve pressure difference ΔP1 is increased by the amount equivalent to a value F2a from "0". There is the relationship of F2a+F2b=F2.

Furthermore, like after time t4 of FIGS. 5A to 5C, when the regenerative brake power margin is "0", the apparatus increases the front-wheel brake power by the additional brake power Fadd by increasing the liner valve pressure difference $\Delta P1$ by the value equivalent to the additional brake power Fadd.

In this case, the additional brake power Fadd is generated only from increase in liner valve pressure difference $\Delta P1$. For example, at time t4 of FIGS. 5A to 5C, the liner valve pressure difference $\Delta P1$ is increased by the amount equivalent to a value F3 from "0".

In such a manner, the apparatus preferentially uses the regenerative brake power Freg as the additional brake power Fadd. As a result, when the brake-pedal is additionally depressed during the front/rear brake power distribution controls, the electric energy generated by the motor M can be recovered into the battery B at a maximum.

As described above, even when the brake-pedal is additionally depressed during the front/rear brake power distribution controls, the shortage of the rear-wheel brake power (i.e., the total brake power) is compensated so that characteristics of the total brake power versus the brake-pedal depressing force Fp are matched with the target characteristics shown with solid line A of FIG. 4. As described above, means for generating the additional brake power Fadd corresponds to additional brake power generating means.

(Practical Operation)

Figure 8:
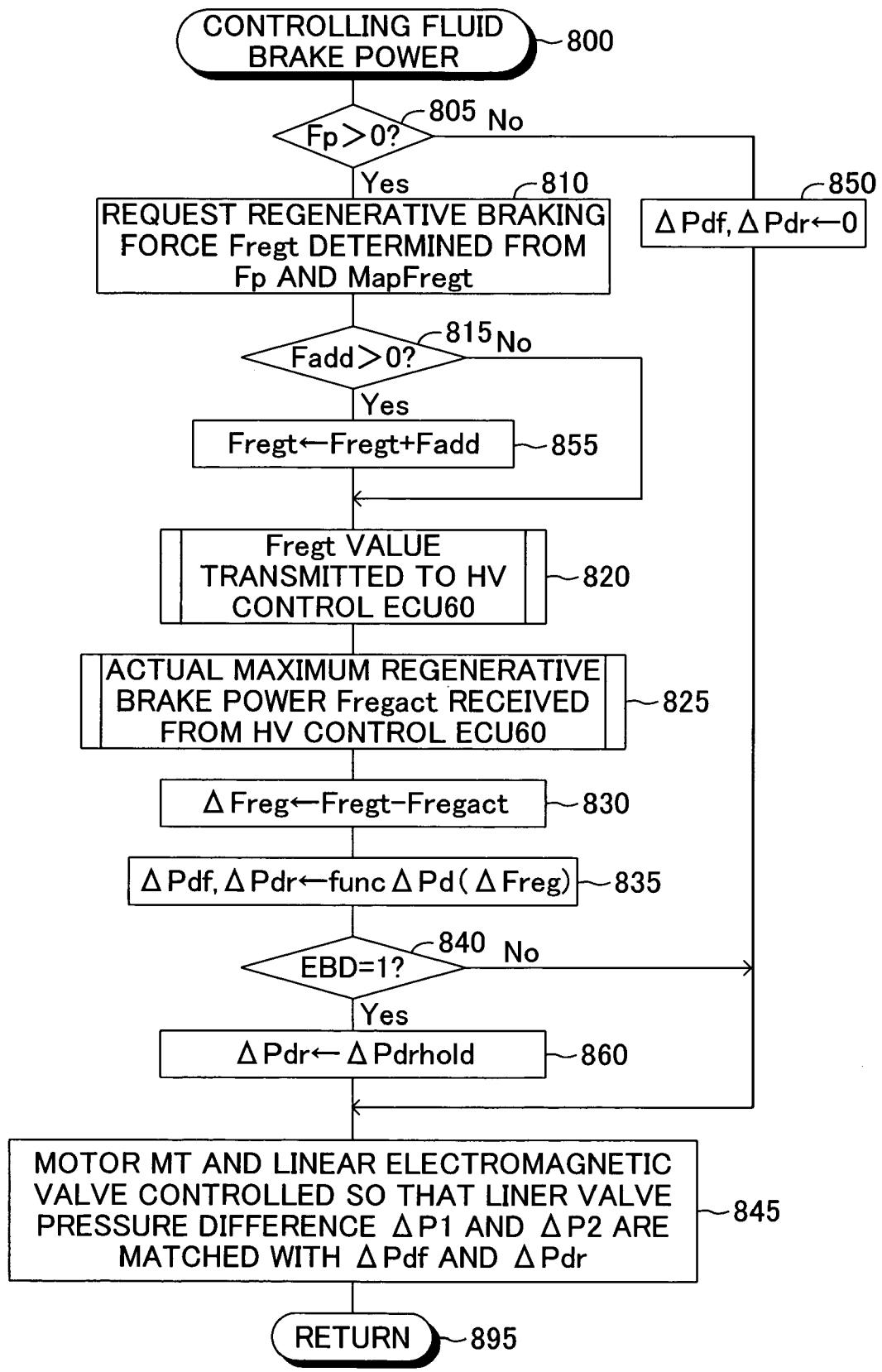
FIG. 8 is a flowchart of a routine for controlling fluid pressure brake power by the brake control ECU shown in FIG. 1.
Figure 9:
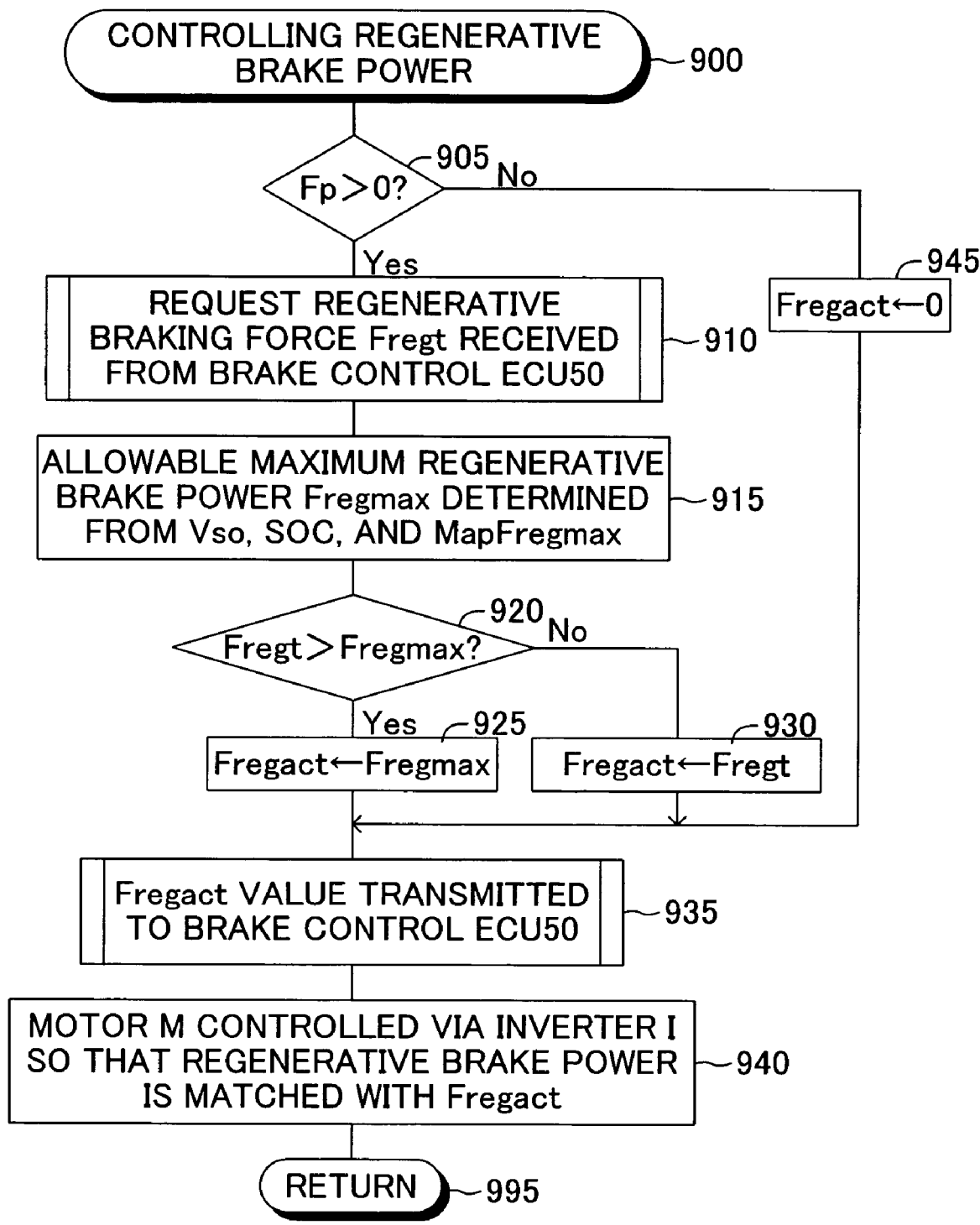
FIG. 9 is a flowchart of a routine for controlling regenerative brake power by the hybrid control ECU shown in FIG. 1.

Then, practical operation of the vehicle brake apparatus 10 according to the first embodiment of the present invention and constructed as described above will be described with reference to FIGS. 6 to 8 showing a routine to be executed by the brake control ECU50 (CPU) with a flowchart and FIG. 9 showing a routine to be executed by the HV control ECU60 (CPU) with a flowchart.

Figure 6:
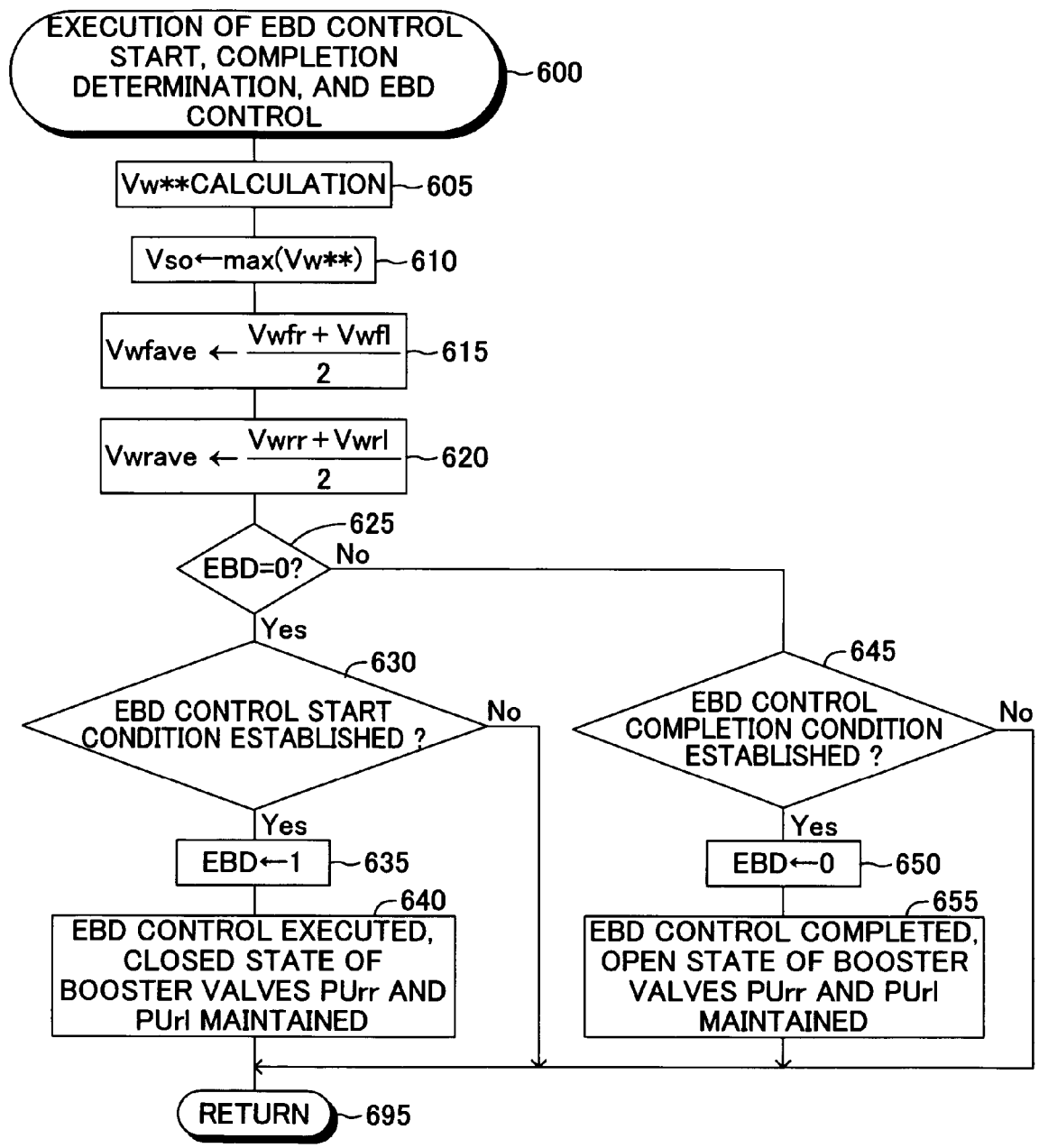
FIG. 6 is a flowchart of a routine for performing the start of front/rear brake power proportion controlling, the determination of its completion, and the execution of the front/rear brake power proportion controlling by the brake control ECU shown in FIG. 1.

The brake control ECU50 repeats a routine of EBD control start, completion determination, and EBD control execution shown in FIG. 6 every predetermined elapsed time (execution time interval $\Delta t$, 6 msec, for example). Thus, at predetermined timing, the brake control ECU50 starts processing operations from Step 600, and at Step 605, the present wheel speeds Vw of wheels  (peripheral speeds of the wheels ) are calculated. Specifically, the brake control ECU50 calculates the wheel speeds Vw on the basis of the variable frequency of outputs of speed sensors 81\*\*.

Then, the brake control ECU50 proceeds to Step 610 so as to set the maximum value of the obtained wheel speeds Vw as an estimated vehicle speed Vso. Subsequently, the brake control ECU50 proceeds to Step 615 so as to obtain an average value Vwfave of the front-wheel wheel speeds and obtain an average value Vwrave of the rear-wheel wheel speeds at following Step 620**.

Then, the brake control ECU50 proceeds to Step 625 so as to determine whether the value of an EBD control execution flag EBD is "0". The value "1" of the EBD control execution flag EBD shows that the EBD control is in operation and the value "0" shows that it is not in operation.

When the EBD control is not in operation at present as well as EBD control start conditions (below mentioned) are not established, the brake control ECU50 determines "yes" at Step 625 so as to proceed to Step 630 for determining whether the EBD control start conditions are established. The EBD control start conditions are established when the brake-pedal depressing force Fp obtained from the brake-pedal depressing force sensor 83 is larger than "0" as well as the front/rear wheel speed difference $\Delta VW$ (=Vwfave−Vwravew) exceeds the determination reference value $\Delta Vwref1$.

As the EBD control start conditions are not established at present, the brake control ECU50 determines "no" at Step 630 so as to directly proceed to Step 695 for once completing the routine. Thereafter, the brake control ECU50 repeats processing operations of Steps 605 to 630 until the EBD control start conditions are established. The value of the EBD control execution flag EBD is thereby maintained "0".

Figure 7:
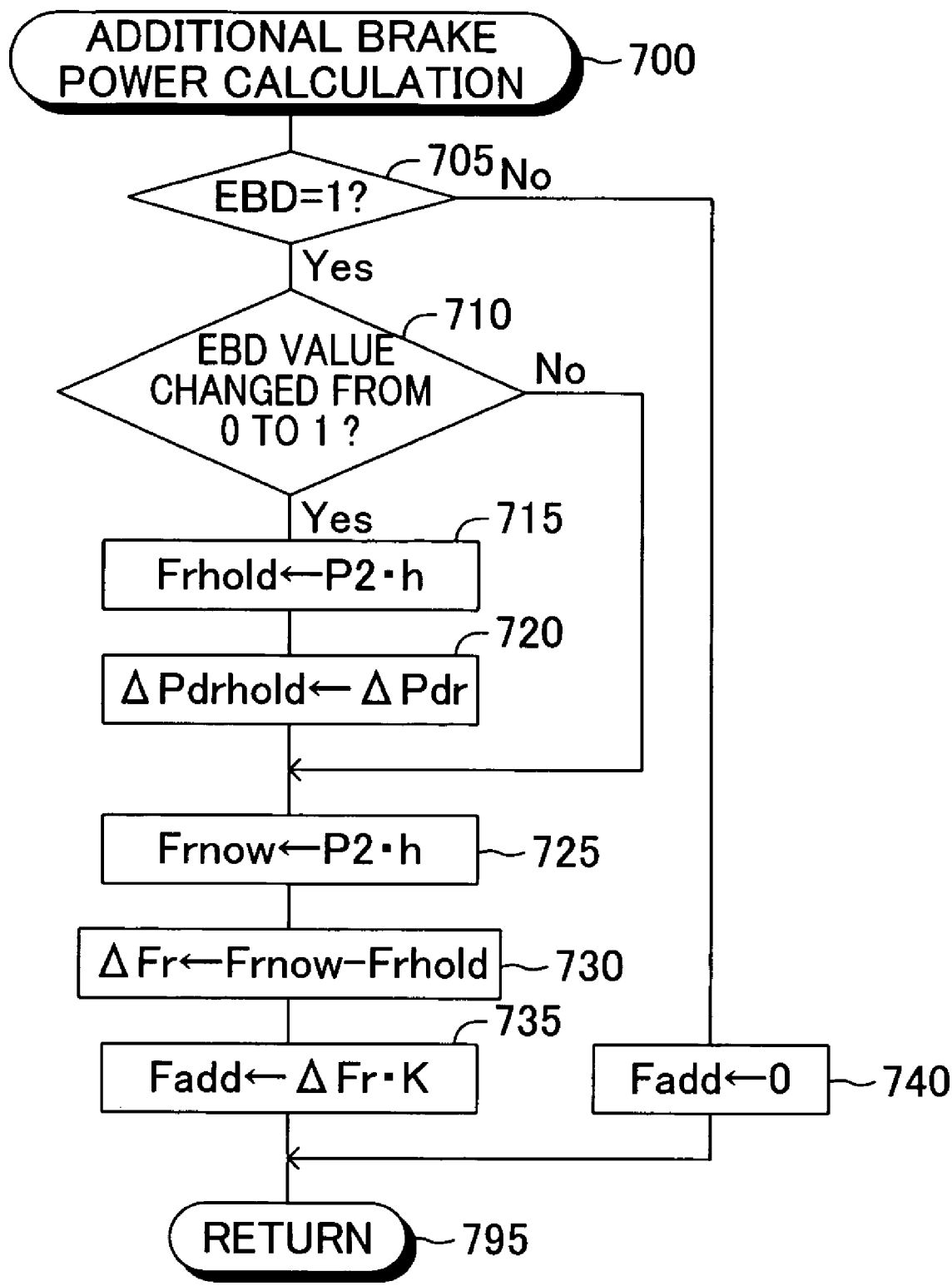
FIG. 7 is a flowchart of a routine for calculating additional brake power by the brake control ECU shown in FIG. 1.

The brake control ECU50 also repeats a routine for calculating the additional brake power shown in FIG. 7 every predetermined elapsed time (execution time interval $\Delta t$, 6 msec, for example). Thus, at predetermined timing, the brake control ECU50 starts processing operations from Step 700, and at Step 705, it determines whether the value of the EBD control execution flag EBD is "1" i.e., whether the EBD control is in operation.

When the EBD control is not in operation at present, the brake control ECU50 determines "no" at Step 705 so as to proceed to Step 740 for setting the additional brake power Fadd at "0". Then, it proceeds to Step 795 for once completing the routine. When the EBD control is not in operation like this, the additional brake power Fadd is set at "0".

The brake control ECU50 also repeats a routine for controlling the fluid pressure brake power shown in FIG. 8 every predetermined elapsed time (execution time interval $\Delta t$, 6 msec, for example). Thus, at predetermined timing, the brake control ECU50 starts processing operations from Step 800, and at Step 805, it determines whether the present brake-pedal depressing force Fp obtained from the brake-pedal depressing force sensor 83 is larger than "0" i.e., whether the brake-pedal BP is depressed.

When the brake-pedal BP is depressed at present as well as the EBD control is not in operation, the brake control ECU50 determines "yes" at Step 805 so as to proceed to Step 810 for determining the request regenerative braking force Fregt on the basis of the obtained brake-pedal depressing force Fp and a table MapFregt(Fp) for obtaining the request regenerative braking force Fregt with an argument of Fp (i.e., the compensation brake power Fcomp). Thereby, the request regenerative braking force Fregt is established to have the same value as the compensation brake power Fcomp relative to the brake-pedal depressing force Fp.

Then, the brake control ECU50 proceeds to Step 815 so as to determine whether the additional brake power Fadd calculated in the routine of FIG. 7 is larger than "0". As the EBD control is not in operation at present, the additional brake power Fadd is set to be "0" as described above, so that the brake control ECU50 determines "no" at Step 815 so as to proceed to Step 820.

When the brake control ECU50 proceeds to Step 820, it feeds the value of the request regenerative braking force Fregt determined at above Step 810 (or at below-mentioned Step 855) to the HV control ECU60 through CAN communication. Then, at Step 825, the brake control ECU50 receives the new value of the actual regenerative brake power Fregact calculated in a routine (below-mentioned) through the CAN communication.

Consequently, the brake control ECU50 proceeds to Step 830 so as to obtain regenerative brake power shortage $\Delta Freg$ by subtracting the received actual regenerative brake power Fregact from the request regenerative braking force Fregt determined at Step 810 (or at below-mentioned Step 855).

Then, the brake control ECU50 proceeds to Step 835 so as to obtain the front-wheel instructed pressure difference $\Delta Pdf$ and the rear-wheel instructed pressure difference $\Delta Pdr$ ($\Delta Pdf=\Delta Pdr$) on the basis of the obtained regenerative brake power shortage $\Delta Freg$ and a function func$\Delta pd$ ($\Delta Freg$) for obtaining the instructed pressure difference $\Delta Pd$ with an argument of ΔFreg. Thereby, the front-wheel instructed pressure difference ΔPdf and the rear-wheel instructed pressure difference ΔPdr are set to values for equalizing the linear valve pressure difference part Fval with the regenerative brake power shortage ΔFreg.

Then, the brake control ECU50 proceeds to Step 840 so as to determine whether the value of the EBD control execution flag EBD is "1". As the EBD control is not in operation at present, the brake control ECU50 determines "no" at Step 840 so as to directly proceed to Step 845. At Step 845, the brake control ECU50 controls the DC motor MT and the linear electromagnetic valves PC1 and PC2 so that the liner valve pressure differences ΔP1 and ΔP2 agree with the obtained front/rear-wheel instructed pressure differences ΔPdf and ΔPdr, respectively, and then it proceeds to Step 895 for once completing the routine. As a result, the liner valve pressure differences ΔP1 and ΔP2 are controlled to agree with the obtained front/rear-wheel instructed pressure differences ΔPdf and ΔPdr, respectively.

On the other hand, when the brake-pedal BP is not depressed at present, the brake control ECU50 determines "no" at Step 805 so as to proceed to Step 850 for setting both the front/rear-wheel instructed pressure differences ΔPdf and ΔPdr to be "0" so as to execute the operation at Step 845 mentioned above. As both the liner valve pressure differences ΔP1 and ΔP2 are thereby set to be "0", the linear valve pressure difference part Fval becomes "0". In this case, the actual regenerative brake power Fregact is also set "0" as will be described later, so that the compensation brake power Fcomp becomes "0" and the total brake power becomes "0".

On the other hand, the HV control ECU60 repeats a routine for controlling the regenerative brake power shown in FIG. 9 every predetermined elapsed time (execution time interval Δt, 6 msec, for example). Thus, at predetermined timing, the HV control ECU60 starts processing operations from Step 900, and at Step 905, it executes the same operation as at Step 805 described above.

When the brake-pedal BP is depressed at present as well as the EBD control is not in operation, the HV control ECU60 determines "yes" at Step 905 so as to proceed to Step 910. At Step 910, the HV control ECU60 receives the value of the request regenerative braking force Fregt fed from the brake control ECU50 by the operation at above Step 820 through the CAN communication. Then, the HV control ECU60 proceeds to Step 915 for determining the allowable maximum regenerative brake power Fregmax on the basis of the estimated vehicle speed Vso obtained at above Step 610, the SOC obtained from the battery ECU, and a table MapFregmax for obtaining the allowable maximum regenerative brake power Fregmax with arguments of Vso and SOC.

Then, the HV control ECU60 proceeds to Step 920 for determining whether the received request regenerative braking force Fregt is larger than the determined allowable maximum regenerative brake power Fregmax. If determined "yes", the HV control ECU60 proceeds to Step 925 for setting the actual regenerative brake power Fregact to have the same value as the allowable maximum regenerative brake power Fregmax. On the other hand, if determined "no", the HV control ECU60 proceeds to Step 930 for setting the actual regenerative brake power Fregact to have the same value as the request regenerative brake power Fregt. Thereby, the actual maximum regenerative brake power Fregact is set to have a value smaller than the allowable maximum regenerative brake power Fregmax.

Then, the HV control ECU60 proceeds to Step 935 for feeding the value of the actual regenerative brake power Fregact obtained through the CAN communication to the brake control ECU50. The value of the actual regenerative brake power Fregact fed in such a manner is received by the brake control ECU50 at above Step 825.

Then, the HV control ECU60 proceeds to Step 940 for controlling the motor M via the inverter I so that the regenerative brake power Freg agrees with the actual maximum regenerative brake power Fregact. Thereafter, it proceeds to Step 995 for once completing the routine. Thereby, the regenerative brake power Freg due to the generation resistance of the motor M as a generator is controlled to agree with the actual regenerative brake power Fregact.

On the other hand, when the brake-pedal BP is not depressed at present, the HV control ECU60 determines "no" at Step 905 so as to proceed to Step 945 for setting the actual regenerative brake power Fregact to be "0" so as to execute the operations at Steps 935 and 940 mentioned above. As the regenerative brake power Freg is thereby set to be "0" and the linear valve pressure difference part Fval also becomes "0" as mentioned above, the total brake power becomes "0".

Next, a case where the EBD control start conditions are established in this state will be described. In this case, the brake control ECU50 repeating the routine shown in FIG. 6 determines "yes" at Step 630 so as to proceed to Step 635 for changing the value of the EBD control execution flag EBD from "0" to "1". Then, the brake control ECU50 proceeds to Step 640 for maintaining the rear-wheel booster valves Purr and Purl in a closed state, thereby starting and maintaining the EBD controls.

Since the value of the EBD control execution flag EBD is maintained at "1" thereafter, the brake control ECU50 determines "No" at Step 625 so as to proceed to Step 645 for determining whether the EBD control completion conditions are established. The EBD control completion conditions are established when the brake-pedal depressing force Fp becomes "0" or the front/rear wheel speed difference ΔVW (=Vwfave−Vwrave) is lowered smaller than a determination reference value ΔVwref2 which is smaller than the determination reference value ΔVwref1.

It is immediately after the EBD control start conditions are established at present, so that the EBD control completion conditions are not yet established. Thus, the brake control ECU50 determines "No" at Step 645 so as to directly proceed to Step 695 for once completing the routine. Thereafter, the brake control ECU50 repeats processing operation at Step 645 so as to determine "No" until the EBD control completion conditions are established. The value of the EBD control execution flag EBD is thereby maintained "1" while the EBD controls are continued.

When the value of the EBD control execution flag EBD is changed from "0" to "1" immediately after the start of the EBD controls in such a manner, the brake control ECU50 repeating the routine shown in FIG. 7 determines "Yes" at Step 705 so as to proceed to Step 710.

At Step 710, the brake control ECU50 determines whether the value of the EBD control execution flag EBD is immediately after being changed from "0" to "1" or not. As it is immediately after the value of the EBD control execution flag EBD is changed from "0" to "1" at present, the brake control ECU50 determines "Yes" at Step 710 so as to proceed to Step 715 for obtaining the rear-wheel brake power (the sum of the rear-wheel fluid pressure braking forces) at present (at the start of EBD controls) by multiplying the control fluid pressure P2 at present obtained from the wheel cylinder fluid pressure sensor 84-1 by a predetermined coefficient h so as to be stored as a rear-wheel brake power holding value Frhold. During the EBD controlling, the rear-wheel brake power is held at this value.

Consequently, at Step 720, the brake control ECU50 stores the rear-wheel instructed pressure difference ΔPdr at present (at the start of EBD controls) required at above Step 835 as a rear-wheel instructed pressure difference holding value ΔPdrhold. As will be described later, during the EBD controlling, the rear-wheel instructed pressure difference ΔPdr is held at this rear-wheel instructed pressure difference holding value ΔPdrhold.

Then, the brake control ECU50 proceeds to Step 725 for obtaining the present rear-wheel brake power Frnow (changeable all the time) by multiplying the control fluid pressure P2 at present obtained from the wheel cylinder fluid pressure sensor 84-2 by the predetermined coefficient h. Then, at Step 730, the rear-wheel brake power shortage ΔFr is set to be the value obtained by subtracting the rear-wheel brake power holding value Frhold from the present rear-wheel brake power Frnow.

Then, at Step 735, the brake control ECU50 sets the additional brake power Fadd to be the value obtained by multiplying the rear-wheel brake power shortage ΔFr established as above by a coefficient k ("1" according to the embodiment). Thereafter, the brake control ECU50 repeats processing operations of Steps 705, 710, and 725 to 735 as long as the EBD controls are continued (EBD=1). Thereby, if the brake-pedal is additionally depressed during the EBD controlling, the rear-wheel brake power shortage ΔFr is increased larger than "0", so that the additional brake power Fadd becomes larger than "0".

When the additional brake power Fadd becomes larger than "0" by additionally depressing the brake-pedal during the EBD controlling in such a manner, the brake control ECU50 repeating the routine shown in FIG. 8 determines "yes" at Step 815 so as to proceed to Step 855 for setting the request regenerative braking force Fregt to have the value obtained by adding the additional brake power Fadd (>0) to the value determined at above Step 810 (i.e., the same value as the compensation brake power Fcomp to the brake-pedal depressing force Fp shown in FIG. 4).

As a result, the sum of the additional brake power Fadd and the request regenerative braking force Fregt is transmitted to the HV control ECU60 at Step 820. At above Steps 920 to 930 of FIG. 9, on the basis of the comparison between the sum of the additional brake power Fadd and the request regenerative braking force Fregt and the allowable maximum regenerative brake power Fregmax determined at Step 915, the actual maximum regenerative brake power Fregact is determined.

Then, the value of the actual maximum regenerative brake power Fregact determined in such a manner is transmitted to the brake control ECU50 at Step 935. As a result, at above Steps 830 and 835 of FIG. 8, using the actual regenerative brake power Fregact determined in such a manner and the sum of the additional brake power Fadd and the request regenerative braking force Fregt, the front/rear-wheel instructed pressure differences ΔPdf and ΔPdr are determined.

In this case, when the brake control ECU50 proceeds to Step 840, it determines "Yes" so as to proceed to Step 860 for changing (maintaining) only the rear-wheel instructed pressure difference ΔPdr to the rear-wheel instructed pressure difference holding value ΔPdrhold stored at above Step 720. Thereby, during the EBD controlling, the rear-wheel instructed pressure difference ΔPdr is held at the rear-wheel instructed pressure difference holding value ΔPdrhold. The rear-wheel brake power shortage ΔFr calculated at Step 730 can thus represent the shortage of the rear-wheel brake power generated by the additional depression during the EBD controlling with high accuracy.

In the case where the additional brake power Fadd does not exceed the regenerative brake power margin mentioned above (see time t2 of FIG. 5 for example, which is equivalent to the case where "No" is determined at Step 920), the actual regenerative brake power Fregact (i.e., the regenerative brake power Freg) is increased by the additional brake power Fadd in comparison with the case where the EBD controls are not executed.

In the case where the additional brake power Fadd exceeds the regenerative brake power margin mentioned above (see time t3, t4 of FIG. 5 for example, which is equivalent to the case where "Yes" is determined at Step 920), the actual regenerative brake power Fregact (i.e., the regenerative brake power Freg) is increased to the allowable maximum regenerative brake power Fregmax while the liner valve pressure difference ΔP1 is increased by the value corresponding to the shortage of the regenerative brake power margin relative to the additional brake power Fadd in comparison with the case where the EBD controls are not executed.

In such a manner, when the brake-pedal is additionally depressed during the EBD controlling, the additional brake power Fadd (>0) calculated at Step 735 is added to the front-wheel brake power. At this time, the regenerative brake power Freg is preferentially used as the additional brake power Fadd.

Next, a case where the EBD control completion conditions are established in this state will be described. In this case, the brake control ECU50 repeating the routine shown in FIG. 6 determines "yes" at Step 645 so as to proceed to Step 650 for changing the value of the EBD control execution flag EBD from "1" to "0". Then, the brake control ECU50 proceeds to Step 650 for maintaining the rear-wheel booster valves Purr and Purl in an open state, thereby completing the EBD controls.

Since the value of the EBD control execution flag EBD is maintained at "0" thereafter, the brake control ECU50 determines "Yes" at Step 625 so as to proceed to Step 630 for again monitoring whether the EBD control start conditions are established. Thus, the brake control ECU50 determines "No" at Step 705 so as to proceed to Step 740 for setting the additional brake power Fadd at "0".

Thereby, the brake control ECU50 determines "No" at Steps 815 and 840, so that the processing operation when the EBD controls are not executed is started again.

As described above, in the vehicle brake (control) apparatus according to the first embodiment of the present invention, the front-wheel brake power is controlled by the fluid pressure brake power composed of the allocation of the VB fluid pressure part Fvb to front wheels (the front-wheel VB fluid pressure part Fvbf) and the allocation of the linear valve pressure difference part Fval to the front wheels (the increase in fluid pressure braking force to the liner valve pressure difference ΔP1, the front-wheel pressuring fluid pressure brake power) and the regenerative brake power Freg, while the rear-wheel brake power is controlled by only the fluid pressure brake power composed of the allocation of the VB fluid pressure part Fvb to rear wheels (the rear-wheel VB fluid pressure part Fvbr) and the allocation of the linear valve pressure difference part Fval to the rear wheels (the increase in fluid pressure braking force to the liner valve pressure difference ΔP2, the rear-wheel pressuring fluid pressure brake power). By executing the regenerative and cooperative brake control in such a manner, characteristics of the total brake power (=the VB fluid pressure part Fvb+the compensation brake power Fcomp) versus the brake-pedal depressing force Fp are matched with the target characteristics shown with solid line A of FIG. 4.

In addition, according to the first embodiment, if the establishment of predetermined conditions is satisfied, front/rear braking force proportioning controls are made for securing rear-wheel brake power. Also, according to the first embodiment, when a brake-pedal is additionally depressed during the execution of the front/rear braking force proportioning controls, additional brake power Fadd with the same power as rear-wheel brake power shortage ΔFr is added to front-wheel brake power. Thereby, the rear-wheel brake power shortage (i.e., the shortage of the total brake power) when the brake-pedal is additionally depressed during the execution of the front/rear braking force proportioning controls can be compensated. As a result, even when the brake-pedal is additionally depressed during the execution of the front/rear braking force proportioning controls, characteristics of the total brake power versus the brake-pedal depressing force Fp are matched with the target characteristics shown by solid line A of FIG. 4.

Furthermore, according to the first embodiment, regenerative brake power Freg is used as compensation brake power Fcomp and the additional brake power Fadd preferentially to the pressuring fluid pressure brake power due to liner valve pressure differences ΔP1 and ΔP1. Thereby, the electric energy generated by a motor M can be actively recovered to a battery B, resulting in good gas mileage of a vehicle by improving the energy efficiency of the entire apparatus.

The present invention is not limited to the first embodiment, so that various modifications may be made within the scope of the present invention. For example, according to the first embodiment, the regenerative brake power Freg is used as the additional brake power Fadd preferentially to the pressuring fluid pressure brake power due to the liner valve pressure difference ΔP1; alternatively, only the pressuring fluid pressure brake power due to the liner valve pressure difference ΔP1 may be used as the additional brake power Fadd.

Also, according to the first embodiment, during the execution of EBD controls, the rear-wheel instructed pressure difference ΔPdr is held in the rear-wheel instructed pressure difference holding value ΔPdrhold stored at Step 720; however, during the execution of EBD controls, the rear-wheel instructed pressure difference ΔPdr may be set to have the same value as that determined at Step 835 (i.e., identical to the front-wheel instructed pressure difference ΔPdf) in the same way as that when the EBD controls are not executed.

Also, according to the first embodiment, the rear-wheel brake power shortage ΔFr is calculated by subtracting the rear-wheel brake power holding value Frhold on the basis of the control fluid pressure P2 at the start of EBD controls from the present rear-wheel brake power Frnow on the basis of the control fluid pressure P2 (=Pm+ΔP2) at present during the execution of EBD controls (see Step 730); alternatively, the rear-wheel brake power shortage ΔFr may be calculated by subtracting the rear-wheel brake power holding value Frhold (=Pmhold·h) calculated based on the VB fluid pressure holding value Pmhold at the start of the EBD controls from the present rear-wheel brake power Frnow (=Pmnow·h) calculated based on the present VB fluid pressure Pmnow (master fluid pressure) at present during the execution of EBD controls. In this case, during the execution of the EBD controls, the liner valve pressure difference ΔP2 may also be set at "0".

Also, according to the first embodiment, the compensation brake power Fcomp is composed of the pressuring fluid pressure brake power on the basis of the linear valve pressure difference ΔP1 and the regenerative brake power Freg as the front-wheel brake power and the pressuring fluid pressure brake power on the basis of the liner valve pressure difference AP2 as the rear-wheel brake power; alternatively, by stably setting the liner valve pressure difference AP2 at "0", the compensation brake power Fcomp may be composed only of the pressuring fluid pressure brake power on the basis of the regenerative brake power Freg and the liner valve pressure difference ΔP1 as the front-wheel brake power.

Second Embodiment

Next, a vehicle brake apparatus (a vehicle brake control apparatus) according to a second embodiment of the present invention will be described. Principal points in which the second embodiment differs from the first embodiment are that a hydro-booster fluid pressure generating device 30 (referred to as the HB fluid pressure generating device 30 below) is used instead of the VB fluid pressure generating device 30, and the fluid pressure braking force control unit 40 different from that according to the first embodiment is used. In the description of the second embodiment, like reference characters and symbols designate like components and variables common to the first embodiment.

Figure 10:
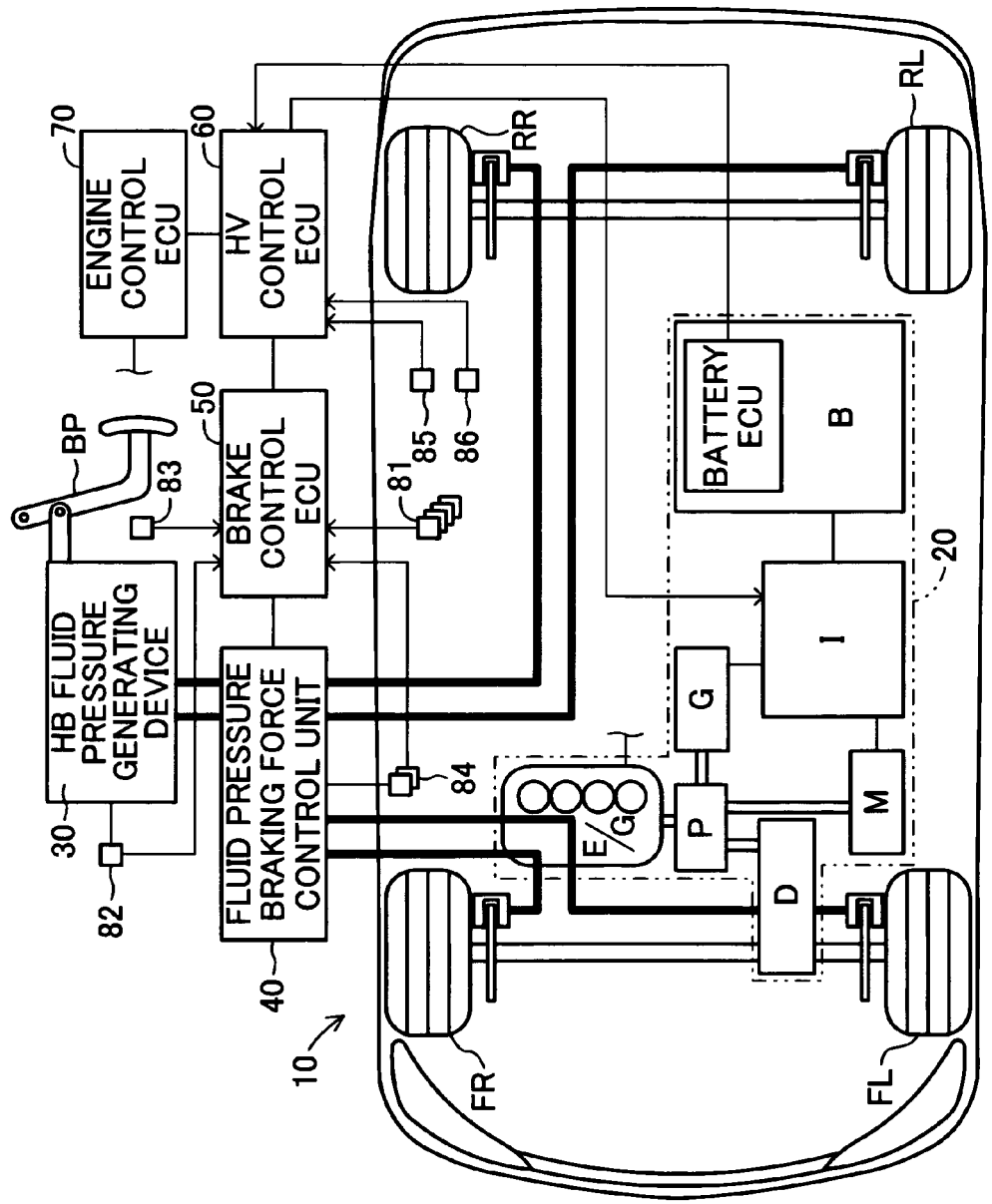
FIG. 10 is a schematic structural view of a vehicle having a vehicle brake apparatus according to a second embodiment of the present invention mounted thereon.
Figure 11:
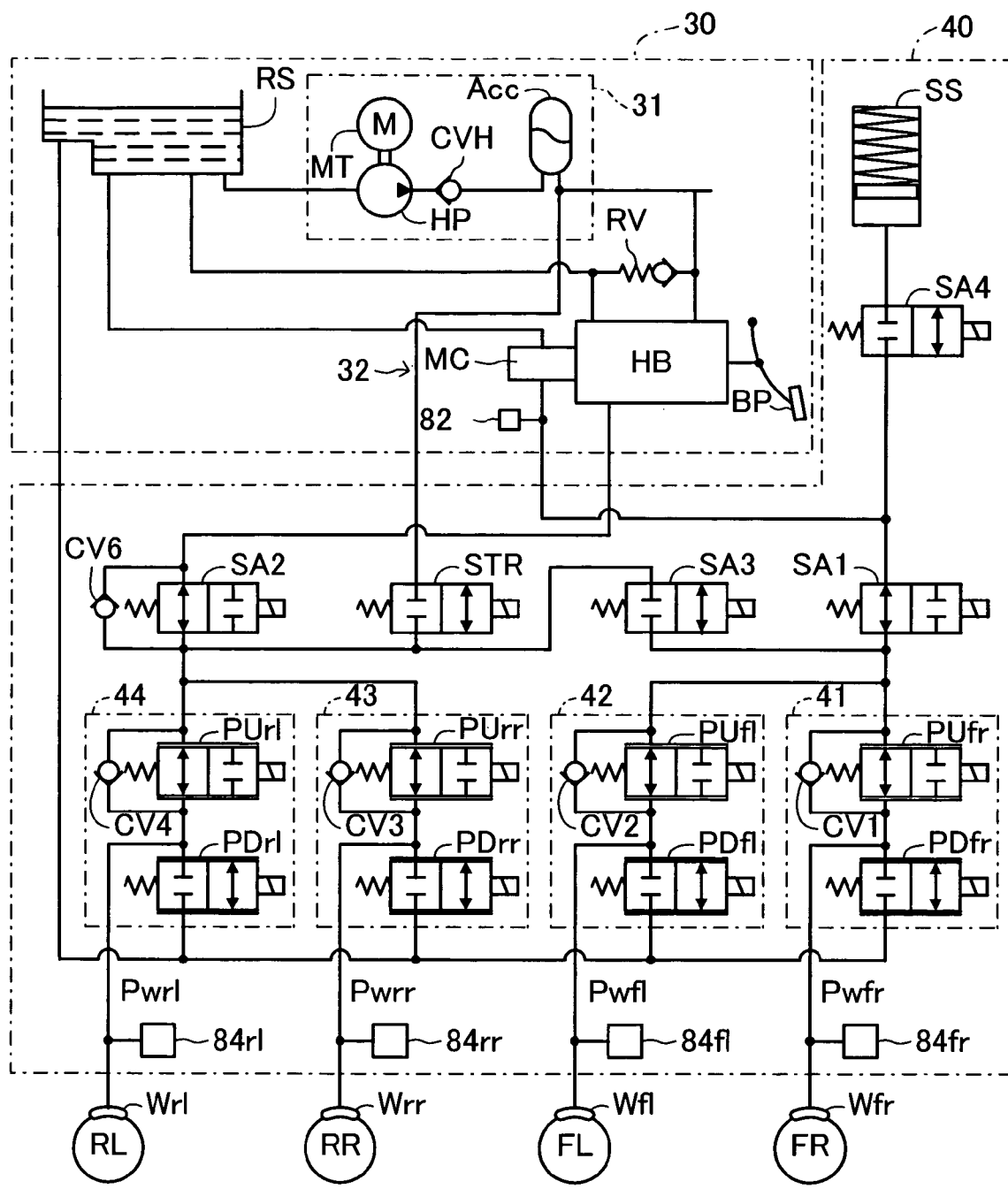
FIG. 11 is a schematic structural view of a hydro-booster fluid pressure generating device and fluid pressure brake power control units shown in FIG. 10.

As shown in FIG. 10, the vehicle brake apparatus according to the second embodiment employs the HB fluid pressure generating device 30 instead of the VB liquid pressure generating device 30 according to the first embodiment. The HB fluid pressure generating device 30, as shown in FIG. 11 illustrating the HB fluid pressure generating device 30 and the fluid pressure braking force control unit 40, includes a high-pressure generating unit 31 and a brake fluid pressure generating unit 32 for generating brake fluid pressure corresponding to the operation force of the brake-pedal BP.

The high-pressure generating unit 31 includes a fluid pressure pump HP driven by a motor MT for boosting brake fluid contained in a reservoir RS and an accumulator ACC connected to the delivery of the fluid pressure pump HP via a check valve CVH for storing the brake fluid boosted by the fluid pressure pump HP.

The motor MT is driven when the fluid pressure in the accumulator ACC is lowered lower than a predetermined lower limit while is stopped when the fluid pressure in the accumulator ACC is raised higher than a predetermined upper limit. The fluid pressure in the accumulator ACC is thereby adjusted in a pressure range (high pressure) between the lower limit and the upper limit.

A relief valve RV is provided between the accumulator ACC and the reservoir RS, so that when the brake fluid in the accumulator ACC has an abnormal pressure higher than the upper limit, it is returned to the reservoir RS, thereby protecting the fluid pressure circuit of the high-pressure generating unit 31.

The brake fluid pressure generating unit 32 includes a hydro-booster HB being movable corresponding to the operation of the brake-pedal BP and a master cylinder MC connected to the hydro-booster HB. The hydro-booster HB helps the operating force of the brake-pedal BP at a predetermined rate using the adjusted high-pressure in the accumulator ACC supplied from the high-pressure generating unit 31 so as to transmit the operating force helped in such a manner to the master cylinder MC.

The master cylinder MC generates a master cylinder fluid pressure corresponding to the helped operating force of the brake-pedal BP. The hydro-booster HB also generates a regulator fluid pressure with substantially the same pressure as the master cylinder fluid pressure corresponding to the helped operating force by applying the master cylinder fluid pressure. The structures of the master cylinder MC and the hydro-booster HB are known, so that the detailed description is omitted. In such a manner, the master cylinder MC and the hydro-booster HB generate the master cylinder fluid pressure and the regulator fluid pressure corresponding to the operation of the brake-pedal BP, respectively.

The fluid pressure braking force control unit 40, as shown in FIG. 11, includes the FR brake liquid pressure adjustment unit 41, the FL brake liquid pressure adjustment unit 42, the RR brake liquid pressure adjustment unit 43, and the RL brake liquid pressure adjustment unit 44 in the same way as in the first embodiment.

Between the master cylinder MC and upstream portions of the FR brake liquid pressure adjustment unit 41 and the FL brake liquid pressure adjustment unit 42, a control valve SA1 is arranged, which is a two-port two-position selector type normally open electromagnetic valve. Similarly, between the hydro-booster HB and upstream portions of the RR brake liquid pressure adjustment unit 43 and the RL brake liquid pressure adjustment unit 44, a control valve SA2 is arranged, which is a two-port two-position selector type normally open electromagnetic valve.

On a pipe line connecting between the upstream portions of the FR brake liquid pressure adjustment unit 41 and the FL brake liquid pressure adjustment unit 42 and the upstream portions of the RR brake liquid pressure adjustment unit 43 and the RL brake liquid pressure adjustment unit 44, a control valve SA3 is arranged, which is a two-port two-position selector type normally closed electromagnetic valve. Furthermore, between the high-pressure generating unit 31 and the above-mentioned pipe line, a selector valve STR is arranged, which is a two-port two-position selector type normally closed electromagnetic valve.

As a result, to the upstream portions of the FR brake liquid pressure adjustment unit 41 and the FL brake liquid pressure adjustment unit 42, the master cylinder fluid pressure is applied when the control valves SA1 and SA3 (and the selector valve STR) are in a non-excited state (shown in the drawing) while the fluid pressure in the accumulator ACC (high pressure) generated by the high-pressure generating unit 31 is applied when the control valves SA1 and SA3 and the selector valve STR are in an excited state.

Similarly, to the upstream portions of the RR brake liquid pressure adjustment unit 43 and the RL brake liquid pressure adjustment unit 44, the regulator fluid pressure is applied when the control valves SA1 and SA3 and the selector valve STR are in the non-excited state while the fluid pressure in the accumulator ACC is applied when the control valves SA1 and SA3 and the selector valve STR are in the excited state.

On a branch pipe forked from a part way of a pipe line connecting between the master cylinder MC and the control valve SA1, a known stroke simulator SS is arranged with a control valve SA4 therebetween, which is a two-port two-position selector type normally closed electromagnetic valve. As a result, when the control valves SA1 and SA3 (and the control valve SA3 and the selector valve STR) are in the excited state, by also exciting the control valve SA4, the operation of the brake-pedal BP can be secured.

The FR brake liquid pressure adjustment unit 41 includes a booster valve PUfr, which is a linear pressure control type normally open electromagnetic valve, and a pressure reducing valve PDfr, which is a linear pressure control type normally closed electromagnetic valve. As a result, the FR brake liquid pressure adjustment unit 41 can linearly control the pressure difference between the fluid pressure in the upstream portion of the FR brake liquid pressure adjustment unit 41 and the brake fluid pressure in the wheel cylinder Wfr (the wheel cylinder liquid pressure Pwfr) by controlling the electric current to be passed to the booster valve PUfr while linearly controlling the pressure difference between the wheel cylinder liquid pressure Pwfr and the fluid pressure in the reservoir RS by controlling the electric current to be passed to the pressure reducing valve PDfr.

The wheel cylinder liquid pressure Pwfr can be thereby controlled freely and linearly by controlling respective electric currents to the booster valve PUfr and the pressure reducing valve PDfr.

The booster valve PUfr is provided with the check valve CV1 arranged in parallel therewith for allowing the brake fluid to flow only in one direction from the wheel cylinder Wfr toward the upstream of the FR brake fluid pressure adjustment unit 41, so that when the control valve SA1 is in a first state and the operated the brake-pedal BP is released, the wheel cylinder liquid pressure Pwfr can be rapidly reduced.

Similarly, the FL brake liquid pressure adjustment unit 42, the RR brake liquid pressure adjustment unit 43, and the RL brake liquid pressure adjustment unit 44 include the booster valve PUfl and the pressure reducing valve PDfl; the booster valve PUrr and the pressure reducing valve PDrr; and the booster valve PUrl and the pressure reducing valve PDrl, respectively, so that by controlling each booster valve and each pressure reducing valve, the brake pressures in the wheel cylinders Wfl, Wrr, and Wrl (the rear wheel cylinder liquid pressures Pwfl, Pwrr, and Pwrl) can be linearly controlled, respectively. The booster valves PUfl, PUrr, and PUrl are also provided with check valves CV2, CV3, and CV4 having the same function as that of the check valve CV1 arranged in parallel therewith, respectively.

The control valve SA2 is also provided with the check valve CV6 arranged in parallel therewith for allowing the brake fluid to flow only in one direction from the upstream toward the downstream, so that when the control valve SA2 is in an excited state so that the communication among the hydro-booster HB, the RR brake liquid pressure adjustment unit 43, and the RL brake liquid pressure adjustment unit 44 is blocked, the wheel cylinder liquid pressures Pwrr and Pwrl can be increased by operating the brake-pedal BP.

By the structure described above, when all the electromagnetic valves are in the non-excited state, the fluid pressure braking force control unit 40 can supply the brake fluid pressure corresponding to the operating force of the brake-pedal BP to each wheel cylinder. In this state, by controlling the booster valves PU and the pressure reducing valves PD, the wheel cylinder liquid pressures Pw** can be controlled freely and linearly in a range lower than the brake fluid pressure corresponding to the operating force of the brake-pedal BP (i.e., the master cylinder fluid pressure).

When the brake-pedal BP is not operated (open state), the fluid pressure braking force control unit 40 switches the control valves SA1, SA2, SA3, and SA4 and the selector valve STR in the excited state, and by controlling the respective booster valves PU and the pressure reducing valves PD, the wheel cylinder liquid pressures Pw can be controlled freely and linearly in a range lower than the fluid pressure in the accumulator ACC using the fluid pressure in the accumulator ACC (high pressure) generated by the high-pressure generating unit 31**.

In such a manner, the fluid pressure braking force control unit 40 can apply the fluid pressure brake power to each wheel regardless of the operation of the brake-pedal BP by independently controlling the wheel cylinder fluid pressure of each wheel. As a result, the fluid pressure braking force control unit 40 can achieve known ABS controls, traction controls, vehicle stabilizing controls (specifically, understeer suppressing controls and oversteer suppressing controls), and vehicle spacing controls in addition to the regenerative and cooperative brake control and the front/rear braking force proportioning control by the instruction of the brake control ECU50.

The brake control ECU50 is connected to the wheel speed sensors 81\*\* identical to those of the first embodiment, a master cylinder fluid pressure sensor 82 for outputting a signal showing a master cylinder fluid pressure Pm (see FIG. 11), the brake-pedal depressing force sensor 83 identical to that of the first embodiment, and wheel cylinder fluid pressure sensors 84\*\* for outputting signals showing wheel cylinder fluid pressures Pw\*\* of the wheels\*\*.

(Outline of Regenerative Cooperative Controls According to the Second Embodiment)

Figure 12:
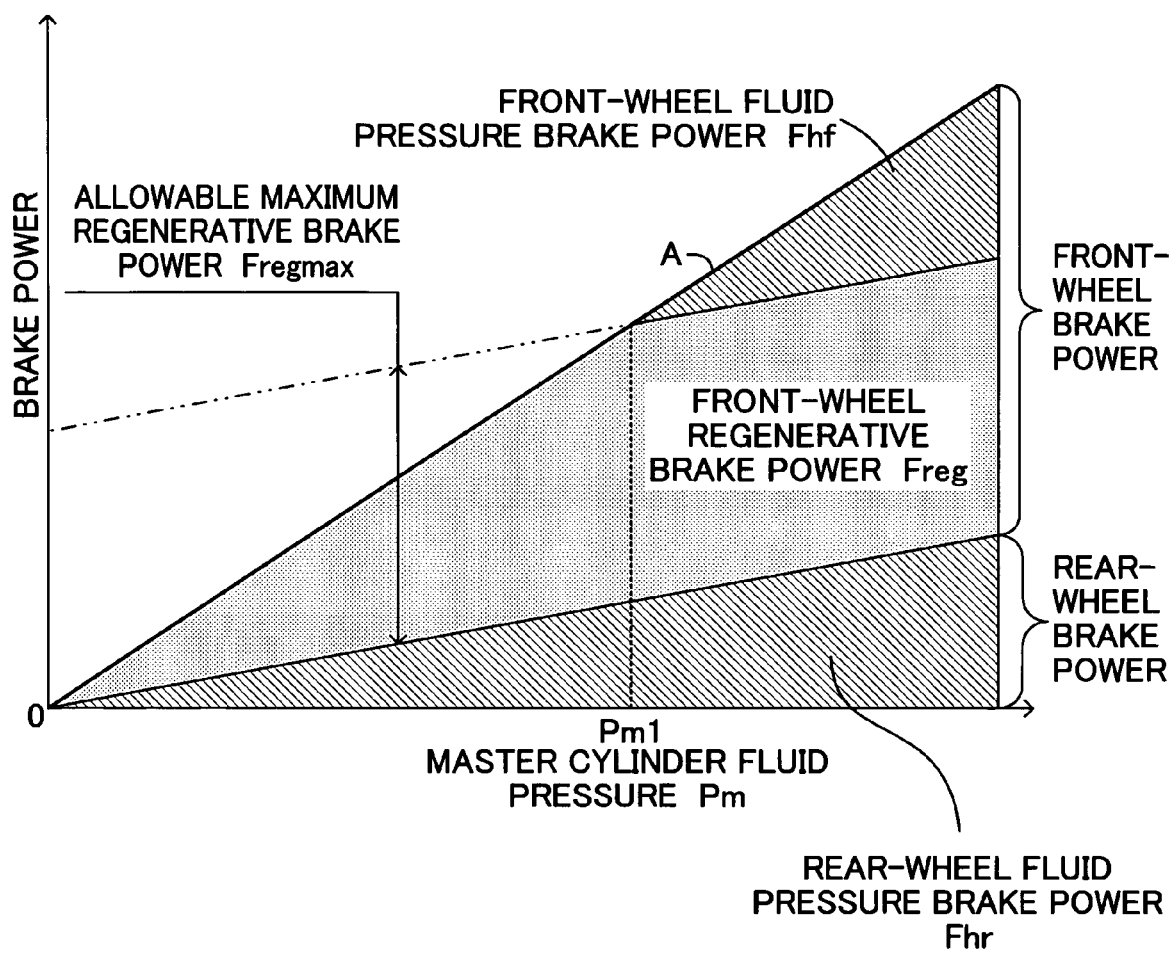
FIG. 12 is a graph showing characteristics of front-wheel brake power (=regenerative brake power+front-wheel fluid pressure brake power) and characteristics of rear-wheel brake power (=rear-wheel fluid pressure brake power) versus a master cylinder fluid pressure, and target characteristics of total brake power versus the master cylinder fluid pressure, when the vehicle brake apparatus shown in FIG. 10 is applied.

Next, the outline of regenerative cooperative controls executed by the vehicle brake apparatus 10 according to the second embodiment of the present invention (referred to as the apparatus below) will be described. FIG. 12 shows characteristics of the front-wheel brake power and the rear-wheel brake power versus the master cylinder fluid pressure Pm when the apparatus executes the regenerative and cooperative brake control. Solid line A of FIG. 12 shows target characteristics of the entire brake power that is the sum of the front-wheel brake power and the rear-wheel brake power versus the master cylinder fluid pressure Pm.

In such a manner, in the apparatus, by adjusting the front-wheel brake power and the rear-wheel brake power in accordance with the master cylinder fluid pressure Pm, characteristics of the entire brake power (=the front-wheel brake power+the rear-wheel brake power) versus the master cylinder fluid pressure Pm are matched with the target characteristics shown with solid line A of FIG. 12.

The rear-wheel brake power includes only the fluid pressure brake power (referred to as the rear-wheel fluid pressure brake power Fhr below) that is frictional brake power. The rear-wheel fluid pressure brake power Fhr is the sum of the fluid pressure brake power for the wheel RR and the fluid pressure brake power for the wheel RL. As shown in FIG. 12, the rear-wheel fluid pressure brake power Fhr is set at a value being proportional to the master cylinder fluid pressure Pm.

On the other hand, the front-wheel brake power is the sum of the front-wheel regenerative brake power Freg due to the motor M (see Fig 10) and the fluid pressure brake power (referred to as the front-wheel fluid pressure brake power Fhf below) that is frictional brake power. The front-wheel fluid pressure brake power Fhf is the sum of the fluid pressure brake power for the wheel FR and the fluid pressure brake power for the wheel FL. As shown in FIG. 12, the front-wheel brake power (=the regenerative brake power Freg+the front-wheel fluid pressure brake power Fhf) is also set at a value being proportional to the master cylinder fluid pressure Pm.

In the front-wheel brake power, the allocation of the regenerative brake power Freg is established so as to increase as larger as possible. Specifically, at first, on the basis of the master cylinder fluid pressure Pm, the apparatus obtains the front-wheel brake power. The request regenerative braking force Fregt is set at this value in principle in the same way as in the first embodiment.

The apparatus establishes the actual maximum regenerative brake power Fregact to have the same value as the request regenerative braking force Fregt when the request regenerative braking force Fregt is less than the allowable maximum regenerative brake power Fregmax (specifically, the master cylinder fluid pressure Pm≦Pm1 in FIG. 12). Hence, in this case, the front-wheel cylinder fluid pressures Pwf\* (the wheels FR and FL) are controlled to be "0" so that the front-wheel fluid pressure brake power Fhr becomes "0".

On the other hand, when the request regenerative braking force Fregt is more than the above-mentioned allowable maximum regenerative brake power Fregmax (specifically, the master cylinder fluid pressure Pm≧Pm1 in FIG. 12), the apparatus establishes the actual maximum regenerative brake power Fregact to be identical to the allowable maximum regenerative brake power Fregmax. In addition, the apparatus controls the front-wheel cylinder fluid pressures Pwf\* (the wheels FR and FL) so that the value obtained by subtracting the actual maximum regenerative brake power Fregact from the front-wheel brake power (=the request regenerative braking force Fregt) agrees with the front-wheel fluid pressure brake power Fhf.

Thereby, the regenerative brake power Freg is set as large as possible as long as it does not exceed the allowable maximum regenerative brake power Fregmax regardless whether the request regenerative braking force Fregt exceeds the above-mentioned allowable maximum regenerative brake power Fregmax or not, so that during the operation of the brake-pedal BP, the electric energy generated by the motor M (see FIG. 10) can be positively recovered to the battery B (see FIG. 10).

In such a manner, the sum of the regenerative brake power Freg and the front-wheel fluid pressure brake power Fhf (i.e., the front-wheel brake power) is controlled to agree with the request regenerative braking force Fregt. As a result, characteristics of the total brake power that is the sum of the frictional brake power (=the front-wheel fluid pressure brake power Fhf+the rear-wheel fluid pressure brake power Fhr) and the regenerative brake power Freg versus the master cylinder fluid pressure Pm are matched with the target characteristics shown by solid line A of FIG. 12.

(Coping to the Additional Depression During the Execution of the Front/Rear Braking Force Proportioning Control According to the Second Embodiment)

When the brake-pedal is additionally depressed during the execution of the front/rear braking force proportioning control, the apparatus also generates the additional brake power Fadd as the front-wheel brake power with the same magnitude as that of the rear-wheel brake power shortage ΔFr in addition to the regenerative brake power Freg and the front-wheel fluid pressure brake power Fhf controlled as shown in FIG. 12 in the same way as in the first embodiment.

The additional brake power Fadd is generated by increasing the regenerative brake power Freg and/or the front-wheel fluid pressure brake power Fhf. Furthermore, as the additional brake power Fadd, the regenerative brake power Freg is preferentially used.

Figure 13:
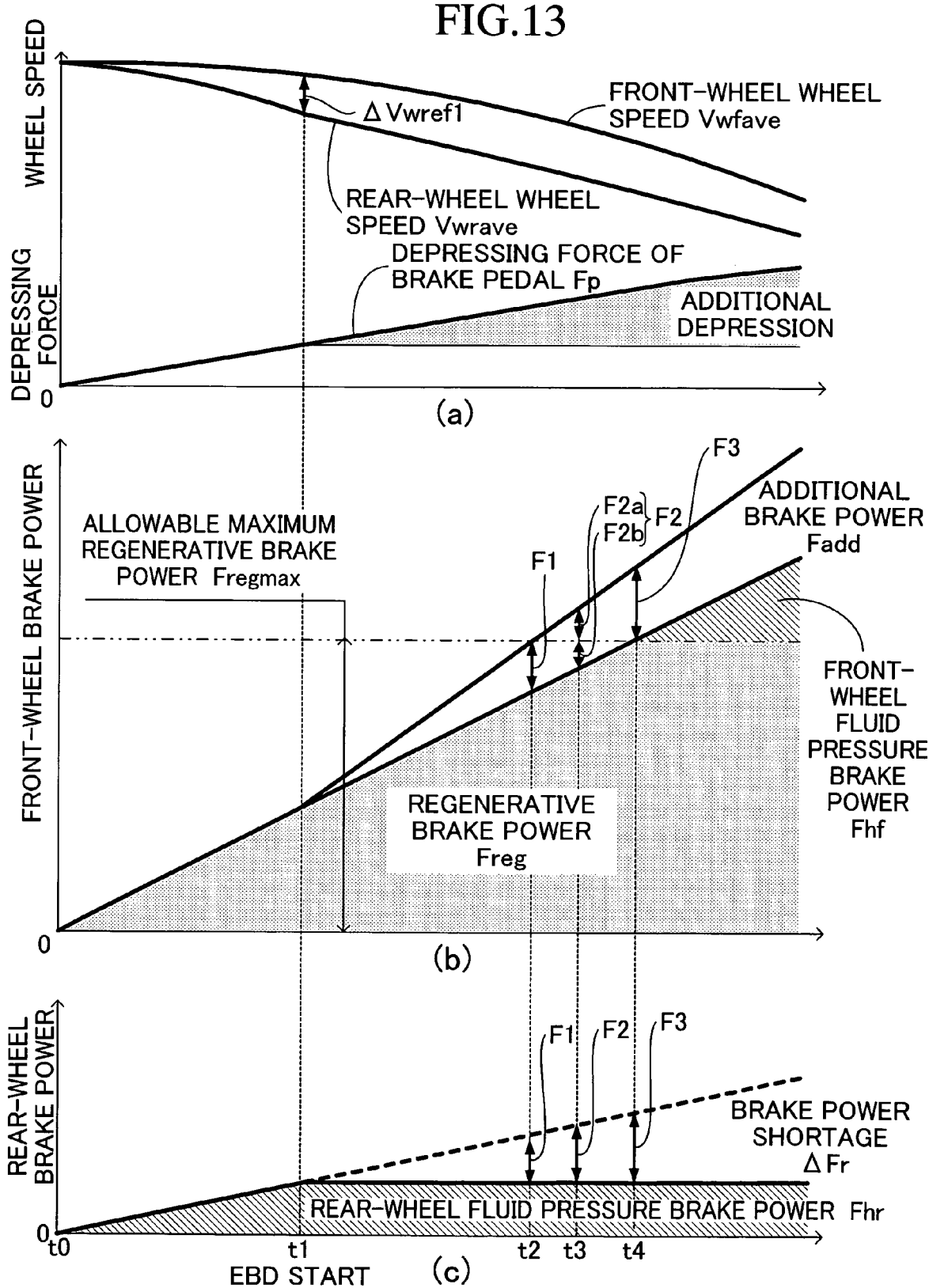
FIGS. 13A to 13C are time charts showing examples of changes in brake pedal depressing force, average value of front-wheel wheel speeds, average value of rear-wheel wheel speeds, front-wheel brake power, and rear-wheel brake power during controlling front/rear brake power proportion when the vehicle brake apparatus shown in FIG. 10 is applied.

More specifically, like from time t1 to time t2 shown in FIGS. 13A to 13C, which are time charts equivalent to FIGS. 5A to 5C described above, when the additional brake power Fadd does not exceed the margin of the regenerative brake power Freg to the allowable maximum regenerative brake power Fregmax (i.e., the regenerative brake power margin), the apparatus increases the front-wheel brake power by the magnitude of the additional brake power Fadd by increasing the regenerative brake power Freg by the additional brake power Fadd.

In this case, the additional brake power Fadd is generated only from the increase in regenerative brake power Freg. For example, at time t2 of FIGS. 13A to 13C, the regenerative brake power Freg is increased by a value F1 from the value determined by the relationship shown in FIG. 12. As a result, the regenerative brake power Freg agrees with the allowable maximum regenerative brake power Fregmax.

Also, like from time t2 to time t4 of FIGS. 13A to 13C, when the regenerative brake power margin is more than "0" and the additional brake power Fadd exceeds the regenerative brake power margin, the apparatus increases the front-wheel brake power by the additional brake power Fadd by increasing the regenerative brake power Freg to the allowable maximum regenerative brake power Fregmax and by increasing the front-wheel fluid pressure brake power Fhf by the value equivalent to the shortage of the regenerative brake power margin relative to the additional brake power Fadd.

In this case, the additional brake power Fadd is generated from increases in regenerative brake power Freg and in front-wheel fluid pressure brake power Fhf. For example, at time t3 of FIGS. 13A to 13C, the regenerative brake power Freg is increased by a value F2b from the value determined by the relationship shown in FIG. 12 while the front-wheel fluid pressure brake power Fhf is increased by a value F2a from "0". There is the relationship of F2a+F2b=F2.

Furthermore, like after time t4 of FIGS. 13A to 13C, when the regenerative brake power margin is "0", the apparatus increases the front-wheel brake power by the additional brake power Fadd by increasing the front-wheel fluid pressure brake power Fhf by the value equivalent to the additional brake power Fadd.

In this case, the additional brake power Fadd is generated only from increase in front-wheel fluid pressure brake power Fhf. For example, at time t4 of FIGS. 13A to 13C, the front-wheel fluid pressure brake power Fhf is increased by the value equivalent to a value F3 from "0".

In such a manner, the apparatus preferentially uses the regenerative brake power Freg as the additional brake power Fadd. As a result, when the brake-pedal is additionally depressed during the front/rear brake power distribution controls, the electric energy generated by the motor M can be recovered into the battery B at a maximum.

As described above, even when the brake-pedal is additionally depressed during the front/rear brake power distribution controls, the shortage of the rear-wheel brake power (i.e., the total brake power) is compensated so that characteristics of the total brake power versus the master cylinder fluid pressure Pm are matched with the target characteristics shown with solid line A of FIG. 12, in the same way as in the first embodiment.

(Practical Operation According to the Second Embodiment)

Then, the practical operation of the vehicle brake apparatus according to the second embodiment will be described below. The brake control ECU50 (CPU) of the apparatus executes the routine shown in FIG. 6 as it is among the routines shown in FIGS. 6 to 8 and executed by the brake control ECU50 according to the first embodiment while executing routines shown in flowcharts of FIGS. 14 and 15, which correspond to FIGS. 7 and 8, respectively, instead of the routines shown in FIGS. 7 and 8. In addition, the HV control ECU60 (CPU) of the apparatus executes the routine as it is, which is shown in FIG. 9 and executed by the HV control ECU60 according to the first embodiment. The routines shown in FIGS. 14 and 15 featuring the second embodiment will be described below.

Figure 14:
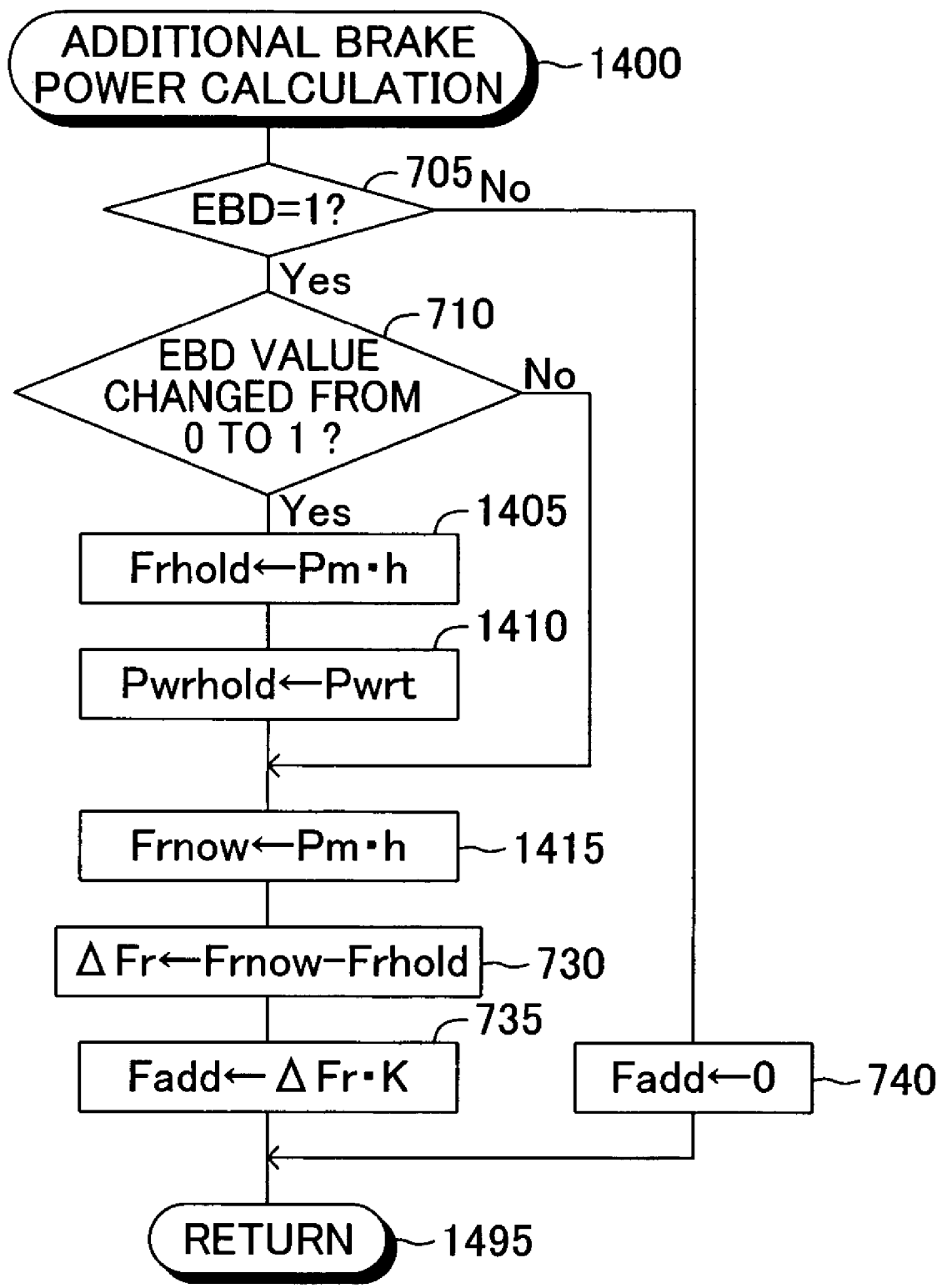
FIG. 14 is a flowchart of a routine for calculating additional brake power by the brake control ECU shown in FIG. 10.

The brake control ECU50 (CPU) of the apparatus repeats the routine calculating the additional brake power shown in FIG. 14 every predetermined elapsed time. The routine shown in FIG. 14 differs from that shown in FIG. 7 in point that Steps 715, 720, and 725 of the routine of FIG. 7 are replaced with Steps 1405, 1410, and 1415, respectively.

Steps 1405 and 1410 are executed at start of the EBD controls in the same way as in above Steps 715 and 720. At Step 1405, the rear-wheel brake power (=the sum of the rear-wheel fluid pressure brake forces Fhr) is obtained by multiplying the master cylinder fluid pressure Pm at present (at start of the EBD controls) obtained from the master cylinder fluid pressure sensor 82 by a predetermined coefficient h, and is stored as the rear-wheel brake power holding value Frhold. During the EBD controlling, the rear-wheel brake power is held at this value.

Figure 15:
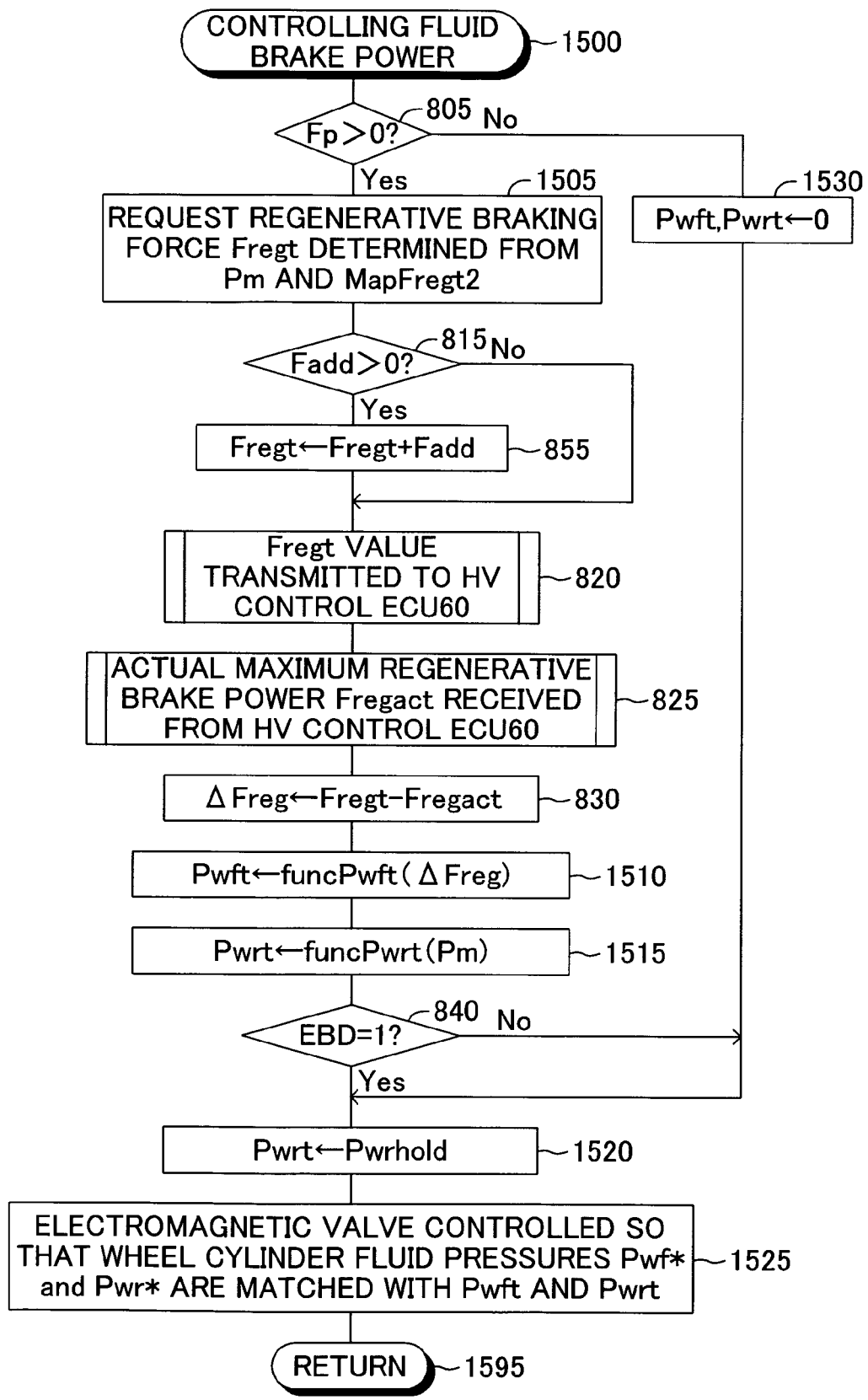
FIG. 15 is a flowchart of a routine for controlling fluid pressure brake power by the brake control ECU shown in FIG. 10.

At Step 1410, the rear-wheel target wheel cylinder fluid pressure Pwrt at present (at start of the EBD controls) obtained at below-mentioned Step 1515 of FIG. 15 is stored as the rear-wheel wheel cylinder fluid pressure holding value Pwrhold. During the EBD controlling, the rear-wheel target wheel cylinder fluid pressure Pwrt is held at the rear-wheel wheel cylinder fluid pressure holding value Pwrhold, as will be described later.

Step 1415 is performed during the EBD controlling after the start of the EBD controls, in the same way as at above Step 725. At Step 1415, the present rear-wheel brake power Frnow (changeable all the time) is obtained by multiplying the master cylinder fluid pressure Pm at present obtained from the master cylinder fluid pressure sensor 82 by the predetermined coefficient h. The present rear-wheel brake power Frnow and the rear-wheel brake power holding value Frhold calculated at above Step 1405 are used when the rear-wheel brake power shortage ΔFr is set at next Step 730, that is, when the additional brake power Fadd is set at following Step 735.

The brake control ECU50 (CPU) of the apparatus also repeats the routine calculating the fluid pressure brake power shown in FIG. 15 every predetermined elapsed time. The routine shown in FIG. 15 differs from that shown in FIG. 8 in point that Steps 810, 860, 845, and 850 of the routine of FIG. 8 are replaced with Steps 1505, 1520, 1525, and 1530, respectively, as well as in point that Step 835 of the routine of FIG. 8 is replaced with Steps 1510 and 1515.

Steps 1505, 1510, 1515, and 1520 are executed when the brake-pedal BP is operated (Fp>0) in the same way as in above Steps 810, 835, and 860. At Step 1505, the request regenerative braking force Fregt is determined on the basis of the master cylinder fluid pressure Pm obtained from the master cylinder fluid pressure sensor 82 and a table Map-Fregt2 (Pm) for obtaining the request regenerative braking force Fregt with an argument of Pm (i.e., the front-wheel brake power). Thereby, the request regenerative braking force Fregt is established to have the same value as that of the front-wheel brake power relative to the master cylinder fluid pressure Pm shown in FIG. 12.

At Step 1510, a target front-wheel wheel cylinder liquid pressure Pwft is obtained on the basis of the regenerative brake power shortage ΔFreg obtained at directly prior Step 830 and a function funcPwft (ΔFreg) for obtaining the target front-wheel wheel cylinder liquid pressure Pwft with an argument of ΔFreg. Thereby, the target front-wheel wheel cylinder liquid pressure Pwft is set at the value for equalizing the front-wheel fluid pressure brake power Fhf with the regenerative brake power shortage ΔFreg obtained as above.

At Step 1515, a target rear-wheel wheel cylinder liquid pressure Pwrt is obtained on the basis of the master cylinder fluid pressure Pm obtained from the master cylinder fluid pressure sensor 82 and a function funcPwrt (Pm) for obtaining the target rear-wheel wheel cylinder liquid pressure Pwrt with an argument of Pm. Thereby, the target rear-wheel wheel cylinder liquid pressure Pwrt is set at the value for equalizing the rear-wheel fluid pressure brake power Fhr with the rear-wheel brake power relative to the master cylinder fluid pressure Pm.

Step 1520 is executed when the brake-pedal BP is operated (Fp>0) during the EBD controlling. At Step 1520, the target rear-wheel wheel cylinder liquid pressure Pwrt is compulsorily changed (maintained) to the rear-wheel wheel cylinder fluid pressure holding value Pwrhold stored at above Step 1410. During the EBD controlling, the target rear-wheel wheel cylinder liquid pressure Pwrt is thereby held at the rear-wheel wheel cylinder fluid pressure holding value Pwrhold.

Step 1530 is executed when the brake-pedal BP is not operated (Fp=0). At Step 1530, both the target front-wheel wheel cylinder liquid pressure Pwft and the target rear-wheel wheel cylinder liquid pressure Pwrt are set at "0".

At step 1525, by controlling various electromagnetic valves in the fluid pressure braking force control unit 40, front-wheel wheel cylinder liquid pressures Pwf* and rear-wheel wheel cylinder liquid pressures Pwr* are matched with the target front-wheel wheel cylinder liquid pressure Pwft and the target rear-wheel wheel cylinder liquid pressure Pwrt established as above, respectively. As a result, the front-wheel wheel cylinder liquid pressures Pwf* and the rear-wheel wheel cylinder liquid pressures Pwr* are controlled to agree with the target front-wheel wheel cylinder liquid pressure Pwft and the target rear-wheel wheel cylinder liquid pressure Pwrt.

Thereby, in the above-mentioned case where the additional brake power Fadd does not exceed the regenerative brake power margin (see time t2 of FIGS. 13A to 13C, being equivalent to the case where "No" is determined at Step 920), the actual regenerative brake power Fregact (i.e., the regenerative brake power Freg) is increased by the additional brake power Fadd in comparison with the case when the EBD controls are not executed.

In the above-mentioned case where the additional brake power Fadd exceeds the regenerative brake power margin (see time t3 and time t4 of FIGS. 13A to 13C, being equivalent to the case where "Yes" is determined at Step 920), the actual regenerative brake power Fregact (i.e., the regenerative brake power Freg) is increased to the allowable maximum regenerative brake power Fregmax while the front-wheel fluid pressure brake power Fhf is increased by the shortage of the regenerative brake power margin relative to the additional brake power Fadd in comparison with the case when the EBD controls are not executed.

In such a manner, when the brake-pedal is additionally depressed during the EBD controlling, the additional brake power Fadd (>0) calculated at Step 735 is added to the front-wheel brake power. At this time, the regenerative brake power Freg is preferentially used as the additional brake power Fadd.

As described above, in the vehicle brake (control) apparatus according to the second embodiment of the present invention, the front-wheel brake power is controlled by the front-wheel fluid pressure brake power Fhf, which is frictional brake power, and the regenerative brake power Freg, while the rear-wheel brake power is controlled only by the rear-wheel fluid pressure brake power Fhf, which is frictional brake power. By executing the regenerative and cooperative brake control in such a manner, characteristics of the total brake power (=the frictional brake power (the front-wheel fluid pressure brake power Fhf+the rear-wheel fluid pressure brake power Fhr)+the regenerative brake power Freg) versus the master cylinder fluid pressure Pm are matched with the target characteristics shown by solid line A of FIG. 12.

In addition, according to the second embodiment, in the same way as in the first embodiment, when the brake-pedal is additionally depressed during the execution of the front/rear braking force proportioning controls, the additional brake power Fadd, which is the same as the rear-wheel brake power shortage ΔFr generated by the additional depression, is added to the front-wheel brake power. As a result, even when the brake-pedal is additionally depressed during the execution of the front/rear braking force proportioning controls, characteristics of the total brake power versus the master cylinder fluid pressure Pm are matched with the target characteristics shown by solid line A of FIG. 12.

Furthermore, according to the second embodiment, regenerative brake power Freg is used as the front-wheel brake power and the additional brake power Fadd preferentially to the front-wheel fluid pressure brake power Fhf. Thereby, the electric energy generated by the motor M can be actively recovered to the battery B, resulting in good gas mileage of a vehicle by improving the energy efficiency of the entire apparatus.

The present invention is not limited to the second embodiment described above, so that various modifications may be made within the scope of the present invention. For example, according to the second embodiment, the regenerative brake power Freg is used preferentially to the front-wheel fluid pressure brake power Fhf as the additional brake power Fadd; alternatively, the front-wheel fluid pressure brake power Fhf may be only used as the additional brake power Fadd.

According to the second embodiment, as shown in FIG. 12, the front-wheel brake power (=the regenerative brake power Freg+the front-wheel fluid pressure brake power Fhf) is also set at a value being proportional to the master cylinder fluid pressure Pm, and in the front-wheel brake power established in such a manner, the regenerative brake power Freg is preferentially used; alternatively, the front-wheel fluid pressure brake power Fhf, the rear-wheel fluid pressure brake power Fhr, and the regenerative brake power Freg may be established as follows.

(1) When the total brake power relative to the master cylinder fluid pressure Pm (referred to as the target brake power below) is less than the allowable maximum regenerative brake power Fregmax, the regenerative brake power Freg is set to be the target brake power while both the front-wheel fluid pressure brake power Fhf and the rear-wheel fluid pressure brake power Fhr are set to be "0".

(2) When the target brake power is more than the allowable maximum regenerative brake power Fregmax while when the front-wheel target allocation brake power, which is the front-wheel brake power when the target brake power is allocated at a predetermined target allocation determined between the front-wheel brake power and the rear-wheel brake power in advance (an ideal brake power allocation, for example), is less than the allowable maximum regenerative brake power Fregmax, the regenerative brake power Freg is set at the value of the allowable maximum regenerative brake power Fregmax; the rear-wheel fluid pressure brake power Fhr is set at the value obtained by subtracting the allowable maximum regenerative brake power Fregmax from the target brake power; and the front-wheel fluid pressure brake power Fhf is set to be "0".

(3) When front-wheel target allocation brake power exceeds the allowable maximum regenerative brake power Fregmax, the regenerative brake power Freg is set at the value of the allowable maximum regenerative brake power Fregmax; the rear-wheel fluid pressure brake power Fhr is set at value of the rear-wheel target allocation brake power, which is the rear-wheel brake power when target brake power is allocated at the target allocation; and the front-wheel fluid pressure brake power Fhf is set at the value obtained by subtracting the allowable maximum regenerative brake power Fregmax from the front-wheel target allocation brake power. As a result, the regenerative brake power Freg is used preferentially to the front-wheel fluid pressure brake power Fhf as the front-wheel brake power and the additional brake power Fadd. Thereby, the electric energy generated by the motor M can be further actively recovered to the battery B, resulting in further good gas mileage of a vehicle by improving the energy efficiency of the entire apparatus.

According to the first and second embodiments, the EBD controls maintain the rear-wheel brake power (specifically, the rear-wheel fluid pressure brake power) at the value at the start of the EBD controlling; however, as long as the EBD controls prohibit an increase in rear-wheel brake power, the EBD controls may also reduce the rear-wheel brake power by a predetermined amount from the value at the start of the EBD controlling.

In addition, according to the first and second embodiments, the apparatus is incorporated in a vehicle with the rear-wheel brake power controlled only by fluid pressure brake power; alternatively, the apparatus may be incorporated in a vehicle with the rear-wheel brake power controlled by both the fluid pressure brake power and the regenerative brake power in the same way as in the front-wheel brake power. In this case, during the EBD controlling, the rear-wheel regenerative brake power is also maintained at the value at the start of the EBD controlling in addition to the rear-wheel wheel cylinder fluid pressure (i.e., the rear-wheel fluid pressure brake power).

What is claimed is:

1. A vehicle brake control apparatus incorporated in a vehicle brake apparatus applied for vehicles having a motor for driving at least front wheels as a power source, the vehicle brake apparatus including:
master fluid pressure generating means for generating a master fluid pressure corresponding to the operation of a brake operating member by a driver;
pressuring means for generating a fluid pressure higher than the master fluid pressure;
pressure adjusting means for adjusting the magnitude of pressuring the master fluid pressure using the fluid pressure by the pressuring means; and
regenerative brake power controlling means for controlling the regenerative brake power generated by the motor, the vehicle brake control apparatus comprising:
regenerative and cooperative brake controlling means for adjusting compensation brake power corresponding to the operation of the brake operating member so that characteristics of total brake power relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means; and
front/rear brake power proportion controlling means for controlling front/rear brake power proportioning which prohibits an increase in brake power applied to rear wheels when the rear wheels are liable to be locked ahead of the front wheels during the operation of the brake operating member by the driver,
wherein the vehicle brake control apparatus further comprises additional brake power generating means for increasing brake power applied to the front wheels by increasing at least the regenerative brake power applied to the front wheels which is controlled so as to adjust the compensation brake power by the regenerative and cooperative brake controlling means when the operation of the brake operating member demands the braking power larger than that at the start of the front/rear brake power proportion controlling during the controlling the front/rear brake power proportion.

2. The apparatus according to claim 1, wherein the additional brake power generating means determines an additional brake power, which is an increase in brake power applied to the front wheels generated by increasing at least the regenerative brake power applied to the front wheels, on the basis of a shortage of brake power applied to the rear wheels, which is generated by the prohibition of the increase in brake power applied to the rear wheels due to the front/rear brake power proportion controlling, relative to a value corresponding to the operation of the brake operating member when the front/rear brake power proportion controlling is not executed.

3. The apparatus according to claim 2, further comprising allowable maximum regenerative brake power determining means for determining allowable maximum regenerative brake power, which is an allowable maximum value of the regenerative brake power applied to the front wheels, corresponding to a state of the vehicle,
wherein when the determined additional brake power does not exceed a margin of the regenerative brake power applied to the front wheels, which is controlled for adjusting the compensation brake power by the regenerative and cooperative brake controlling means, relative to the allowable maximum regenerative brake power, the additional brake power generating means is constructed so as to generate the determined additional brake power by increasing the regenerative brake power applied to the front wheels by the additional brake power.

4. The apparatus according to claim 2, further comprising allowable maximum regenerative brake power determining means for determining allowable maximum regenerative brake power, which is an allowable maximum value of the regenerative brake power applied to the front wheels, corresponding to a state of the vehicle,
wherein when the determined additional brake power exceeds a margin of the regenerative brake power applied to the front wheels, which is controlled for adjusting the compensation brake power by the regenerative and cooperative brake controlling means, to the allowable maximum regenerative brake power, the additional brake power generating means is constructed so as to generate the determined additional brake power by increasing the regenerative brake power applied to the front wheels to the allowable maximum regenerative brake power as well as by increasing the pressuring fluid pressure brake power applied to the front wheels by a shortage of the margin of the regenerative brake power applied to the front wheels relative to the determined additional brake power.

5. A vehicle brake apparatus applied for vehicles having a motor for driving at least front wheels as a power source, the vehicle brake apparatus comprising:

master fluid pressure generating means for generating a master fluid pressure corresponding to the operation of a brake operating member by a driver;

pressuring means for generating a fluid pressure higher than the master fluid pressure;

pressure adjusting means for adjusting the magnitude of pressuring the master fluid pressure using the fluid pressure by the pressuring means;

regenerative brake power controlling means for controlling the regenerative brake power generated by the motor;

regenerative and cooperative brake controlling means for adjusting compensation brake power corresponding to the operation of the brake operating member so that characteristics of total brake power relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means; front/rear brake power proportion controlling means for controlling front/rear brake power proportioning which prohibits an increase in brake power applied to rear wheels when the rear wheels are liable to be locked ahead of the front wheels during the operation of the brake operating member by the driver; and additional brake power generating means for increasing brake power applied to the front wheels by increasing at least the regenerative brake power applied to the front wheels which is controlled so as to adjust the compensation brake power by the regenerative and cooperative brake controlling means when the operation of the brake operating member demands the braking power larger than that at the start of the front/rear brake power proportion controlling during the controlling the front/rear brake power proportion.

6. A medium for recording a vehicle brake control program incorporated in a vehicle brake apparatus applied for vehicles having a motor for driving at least front wheels as a power source, the vehicle brake apparatus including:

master fluid pressure generating means for generating a master fluid pressure corresponding to the operation of a brake operating member by a driver;

pressuring means for generating a fluid pressure higher than the master fluid pressure;

pressure adjusting means for adjusting the magnitude of pressuring the master fluid pressure using the pressuring fluid pressure by the pressuring means; and regenerative brake power controlling means for controlling the regenerative brake power generated by the motor, the vehicle brake control program comprising the steps of:

regenerative and cooperative brake controlling for adjusting compensation brake power corresponding to the operation of the brake operating member so that characteristics of total brake power relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means;

front/rear brake power proportion controlling for controlling front/rear brake power proportioning which prohibits an increase in brake power applied to rear wheels when rear wheels are liable to be locked ahead of the front wheels during the operation of the brake operating member by the driver; and additional brake power generating for increasing brake power applied to the front wheels by increasing at least the regenerative brake power applied to the front wheels which is controlled so as to adjust the compensation brake power by the regenerative and cooperative brake controlling means when the operation of the brake operating member demands the braking power larger than that at the start of the front/rear brake power proportion controlling during the controlling the front/rear brake power proportion.

7. A vehicle brake control apparatus incorporated in a vehicle brake apparatus applied for vehicles having a motor for driving at least front wheels as a power source, the vehicle brake apparatus including:

frictional brake power controlling means for controlling frictional brake power applied to wheels of the vehicle independently of the operation of a brake operating member by a driver; and regenerative brake power controlling means for controlling regenerative brake power generated by the motor, the vehicle brake control apparatus comprising: regenerative and cooperative brake controlling means for adjusting the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance; and front/rear brake power proportion controlling means for controlling front/rear brake power proportioning which prohibits an increase in brake power applied to rear wheels when the rear wheels are liable to be locked ahead of the front wheels during the operation of the brake operating member by the driver, wherein the vehicle brake control apparatus further comprises additional brake power generating means for increasing brake power applied to the front wheels by increasing at least the regenerative brake power applied to the front wheels which is controlled by the regenerative and cooperative brake controlling means when the operation of the brake operating member demands the braking power larger than that at the start of the front/rear brake power proportion controlling during the controlling the front/rear brake power proportion.

8. The apparatus according to claim 7, wherein the additional brake power generating means determines an additional brake power, which is an increase in brake power applied to the front wheels generated by increasing at least the regenerative brake power applied to the front wheels on the basis of a shortage of brake power applied to the rear wheels, which is generated by the prohibition of the increase in brake power applied to the rear wheels due to the front/rear brake power proportion controlling, relative to a value corresponding to the operation of the brake operating member when the front/rear brake power proportion controlling is not executed.

9. The apparatus according to claim 8, further comprising allowable maximum regenerative brake power determining means for determining allowable maximum regenerative brake power, which is an allowable maximum value of the regenerative brake power applied to the front wheels, corresponding to a state of the vehicle,
wherein when the determined additional brake power does not exceed a margin of the regenerative brake power applied to the front wheels, which is controlled by the regenerative and cooperative brake controlling means, relative to the allowable maximum regenerative brake power, the additional brake power generating means is constructed so as to generate the determined additional brake power by increasing the regenerative brake power applied to the front wheels by the additional brake power.

10. The apparatus according to claim 8, further comprising allowable maximum regenerative brake power determining means for determining allowable maximum regenerative brake power, which is an allowable maximum value of the regenerative brake power applied to the front wheels, corresponding to a state of the vehicle,
wherein when the determined additional brake power exceeds a margin of the regenerative brake power applied to the front wheels, which is controlled by the regenerative and cooperative brake controlling means, relative to the allowable maximum regenerative brake power, the additional brake power generating means is constructed so as to generate the determined additional brake power by increasing the regenerative brake power applied to the front wheels to the allowable maximum regenerative brake power as well as by increasing the frictional brake power applied to the front wheels by a shortage of the margin of the regenerative brake power applied to the front wheels relative to the determined additional brake power.

11. A vehicle brake apparatus applied for vehicles having a motor for driving at least front wheels as a power source, the vehicle brake apparatus comprising:
frictional brake power controlling means for controlling frictional brake power applied to wheels of the vehicle independently of the operation of a brake operating member by a driver;
regenerative brake power controlling means for controlling regenerative brake power generated by the motor;
regenerative and cooperative brake controlling means for adjusting the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance;
front/rear brake power proportion controlling means for controlling front/rear brake power proportioning which prohibits an increase in brake power applied to rear wheels when the rear wheels are liable to be locked ahead of the front wheels during the operation of the brake operating member by the driver; and
additional brake power generating means for increasing brake power applied to the front wheels by in creasing at least the regenerative brake power applied to the front wheels which is controlled by the regenerative and cooperative brake controlling means when the operation of the brake operating member demands the braking power larger than that at the start of the front/rear brake power proportion controlling during the controlling the front/rear brake power proportion.

12. A medium for recording a vehicle brake control program incorporated in a vehicle brake apparatus applied for vehicles having a motor for driving at least front wheels as a power source, the vehicle brake apparatus including:
frictional brake power controlling means for controlling the frictional brake power applied to wheels of the vehicle independently of the operation of a brake operating member by a driver; and
regenerative brake power controlling means for controlling regenerative brake power generated by the motor, the vehicle brake control program comprising the steps of:
regenerative and cooperative brake controlling for adjusting the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance;
front/rear brake power proportion controlling for controlling front/rear brake power proportioning which prohibits an increase in brake power applied to rear wheels when the rear wheels are liable to be locked ahead of the front wheels during the operation of the brake operating member by the driver; and
additional brake power generating for increasing brake power applied to the front wheels by increasing at least the regenerative brake power applied to the front wheels which is controlled by the regenerative and cooperative brake controlling means when the operation of the brake operating member demands the braking power larger than that at the start of the front/rear brake power proportion controlling during the controlling the front/rear brake power proportion.

13. A vehicle brake control apparatus incorporated in a vehicle brake apparatus applied for vehicles having a motor for driving at least front wheels as a power source, the vehicle brake apparatus including:
master fluid pressure generating means for generating a master fluid pressure corresponding to the operation of a brake operating member by a driver;
pressuring means for generating a fluid pressure higher than the master fluid pressure;

pressure adjusting means for adjusting the magnitude of pressuring the master fluid pressure using the fluid pressure by the pressuring means; and regenerative brake power controlling means for controlling the regenerative brake power generated by the motor, the vehicle brake control apparatus comprising:

regenerative and cooperative brake controlling means for adjusting compensation brake power corresponding to the operation of the brake operating member so that characteristics of total brake power relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means;

front/rear brake power proportion controlling means for controlling front/rear brake power proportioning which prohibits an increase in brake power applied to the rear wheels when the rear wheels are liable to be locked ahead of the front wheels during the operation of the brake operating member by the driver;

allowable maximum regenerative brake power determining means for determining allowable maximum regenerative brake power, which is an allowable maximum value of the regenerative brake power applied to the front wheels, corresponding to a state of the vehicle; and additional brake power generating means for increasing brake power applied to the front wheels by increasing the regenerative brake power applied to the front wheels and/or the pressuring fluid pressure brake power applied to the front wheels which are controlled so as to adjust the compensation brake power by the regenerative and cooperative brake controlling means when the operation of the brake operating member demands the braking power larger than that at the start of the front/rear brake power proportion controlling during the controlling the front/rear brake power proportion, wherein the additional brake power generating means determines an additional brake power, which is an increase in brake power applied to the front wheels generated by increasing the regenerative brake power applied to the front wheels and/or the pressuring fluid pressure brake power applied to the front wheels, on the basis of a shortage of brake power applied to the rear wheels, which is generated by the prohibition of the increase in brake power applied to the rear wheels due to the front/rear brake power proportion controlling relative to a value corresponding to the operation of the brake operating member when the front/rear brake power proportion controlling is not executed, wherein when the determined additional brake power does not exceed a margin of the regenerative brake power applied to the front wheels, which is controlled for adjusting the compensation brake power by the regenerative and cooperative brake controlling means, relative to the allowable maximum regenerative brake power, the additional brake power generating means is constructed so as to generate the determined additional brake power by increasing the regenerative brake power applied to the front wheels by the additional brake power applied to the front wheels by the additional brake power.

14. A vehicle brake control apparatus incorporated in a vehicle brake apparatus applied for vehicles having a motor for driving at least front wheels as a power source, the vehicle brake apparatus including:

master fluid pressure generating means for generating master fluid pressure corresponding to the operation of a brake operating member by a driver;

pressuring means for generating a fluid pressure higher than the master fluid pressure;

pressure adjusting means for adjusting the magnitude of pressuring the master fluid pressure using the fluid pressure by the pressuring means; and regenerative brake power controlling means for controlling the regenerative brake power generated by the motor, the vehicle brake control apparatus comprising:

regenerative and cooperative brake controlling means for adjusting compensation brake power corresponding to the operation of the brake operating member so that characteristics of total brake power relative to the operation of the brake operating member are matched with target characteristics set in advance, the total brake power being the sum of the master fluid pressure brake power, which is fluid pressure brake power based on the master fluid pressure generated by the master fluid pressure generating means, and the compensation brake power composed of the regenerative brake power by the regenerative brake power controlling means and/or pressuring fluid pressure brake power, which is the fluid pressure brake power based on the pressuring magnitude by the pressure adjusting means;

front/rear brake power proportion controlling means for controlling front/rear brake power proportioning which prohibits an increase in brake power applied to rear wheels when the rear wheels are liable to be locked ahead of the front wheels during the operation of the brake operating member by the driver;

allowable maximum regenerative brake power determining means for determining allowable maximum regenerative brake power, which is an allowable maximum value of the regenerative brake power applied to the front wheels, corresponding to a state of the vehicle; and additional brake power generating means for increasing brake power applied to the front wheels by increasing the regenerative brake power applied to the front wheels and/or the pressuring fluid pressure brake power applied to the front wheels which are controlled so as to adjust the compensation brake power by the regenerative and cooperative brake controlling means when the operation of the brake operating member demands the braking power larger than that at the start of the front/rear brake power proportion controlling during the controlling the front/rear brake power proportion, wherein the additional brake power generating means determines an additional brake power, which is an increase in brake power applied to the front wheels generated by increasing the regenerative brake power applied to the front wheels and/or the pressuring fluid pressure brake power applied to the front wheels on the basis of a shortage of brake power applied to the rear wheels, which is generated by the prohibition of the increase in brake power applied to the rear wheels due to the front/rear brake power proportion controlling relative to a value corresponding to the operation of the brake operating member when the front/rear power proportion controlling is not executed, wherein when the determined additional brake power exceeds a margin of the regenerative brake power applied to the front wheels, which is controlled for adjusting the compensation brake power by the regenerative and cooperative brake controlling means, relative to the allowable maximum regenerative brake power, the additional brake power generating means is constructed so as to generate the determined additional brake power by increasing the regenerative brake power applied to the front wheels to the allowable maximum regenerative brake power as well as by increasing the pressuring fluid pressure brake power applied to the front wheels by a shortage of the margin of the regenerative brake power applied to the front wheels relative to the determined additional brake power.

15. A vehicle brake control apparatus incorporated in a vehicle brake apparatus applied for vehicles having a motor for driving at least front wheels as a power source, the vehicle brake apparatus including:

frictional brake power controlling means for controlling frictional brake power applied to wheels of the vehicle independently of the operation of a brake operating member by a driver; and regenerative brake power controlling means for controlling regenerative brake power generated by the motor, the vehicle brake control apparatus comprising:

regenerative and cooperative brake controlling means for adjusting the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance;

front/rear brake power proportion controlling means for controlling front/rear brake power proportioning which prohibits an increase in brake power applied to rear wheels when the rear wheels are liable to be locked ahead of the front wheels during the operation of the brake operating member by the driver;

allowable maximum regenerative brake power determining means for determining allowable maximum regenerative brake power, which is an allowable maximum value of the regenerative brake power applied to the front wheels, corresponding to a state of the vehicle; and additional brake power generating means for increasing brake power applied to the front wheels by increasing the regenerative brake power applied to the front wheels and/or the frictional brake power applied to the front wheels which are controlled by the regenerative and cooperative brake controlling means when the operation of the brake operating member demands the braking power larger than that at the start of the front/rear brake power proportion controlling during the controlling the front/rear brake power proportion, wherein the additional brake power generating means determines an additional brake power, which is an increase in brake power applied to the front wheels generated by increasing the regenerative brake power applied to the front wheels and/or the frictional brake power applied to the front wheels, on the basis of a shortage of brake power applied to the rear wheels, which is generated by the prohibition of the increase in brake power applied to the rear wheels due to the front/rear brake power proportion controlling, relative to a value corresponding to the operation of the brake operating member when the front/rear brake power proportion controlling is not executed, wherein when the determined additional brake power does not exceed a margin of the regenerative brake power applied to the front wheels, which is controlled by the regenerative and cooperative brake controlling means, relative to the allowable maximum regenerative brake power, the additional brake power generating means is constructed so as to generate the determined additional brake power by increasing the regenerative brake power applied to the front wheels by the additional brake power.

16. A vehicle brake control apparatus incorporated in a vehicle brake apparatus applied for vehicles having a motor for driving at least front wheels as a power source, the vehicle brake apparatus including:

frictional brake power controlling means for controlling frictional brake power applied to wheels of the vehicle independently of the operation of a brake operating member by a driver; and regenerative brake power controlling means for controlling regenerative brake power generated by the motor, the vehicle brake control apparatus comprising:

regenerative and cooperative brake controlling means for adjusting the frictional brake power and the regenerative brake power corresponding to the operation of the brake operating member by controlling the frictional brake power controlling means and the regenerative brake power controlling means so that characteristics of the total brake power, which is the sum of the frictional brake power and the regenerative brake power, relative to the operation of the brake operating member are matched with target characteristics set in advance;

front/rear brake power proportion controlling means for controlling front/rear brake power proportioning which prohibits an increase in brake power applied to rear wheels when the rear wheels are liable to be locked ahead of the front wheels during the operation of the brake operating member by the driver;

allowable maximum regenerative brake power determining means for determining allowable maximum regenerative brake power, which is an allowable maximum value of the regenerative brake power applied to the front wheels, corresponding to a state of the vehicle; and additional brake power generating means for increasing brake power applied to the front wheels by increasing the regenerative brake power applied to the front wheels and/or the frictional brake power applied to the front wheels which are controlled by the regenerative and cooperative brake controlling means when the operation of the brake operating member demands the braking power larger than that at the start of the front/rear brake power proportion controlling during the controlling the front/rear brake power proportion, wherein the additional brake power generating means determines an additional brake power, which is an increase in brake power applied to the front wheels generated by increasing the regenerative brake power applied to the front wheels and/or the frictional brake power applied to the front wheels, on the basis of a shortage of brake power applied to the rear wheels, which is generated by the prohibition of the increase in brake power applied to the rear wheels due to the front/rear brake power proportion controlling, relative to a value corresponding to the operation of the brake operating member when the front/rear brake power proportion controlling is not executed, wherein when the determined additional brake power exceeds a margin of the regenerative brake power applied to the front wheels, which is controlled by the regenerative and cooperative brake controlling means, relative to the allowable maximum regenerative brake power, the additional brake power generating means is constructed so as to generate the determined additional brake power by increasing the regenerative brake power applied to the front wheels to the allowable maximum regenerative brake power as well as by increasing the frictional brake power applied to the front wheels by a shortage of the margin of the regenerative brake power applied to the front wheels relative to the determined additional brake power.

* * * * *